(12) United States Patent
Tsai et al.

(10) Patent No.: US 8,675,289 B2
(45) Date of Patent: Mar. 18, 2014

(54) IMAGE CAPTURING OPTICAL LENS SYSTEM

(75) Inventors: Tsung-Han Tsai, Taichung (TW); Hsin-Hsuan Huang, Taichung (TW)

(73) Assignee: Largan Precision Co., Ltd., Taichung (TW)

( * ) Notice: Subject to any disclaimer, the term of this patent is extended or adjusted under 35 U.S.C. 154(b) by 40 days.

(21) Appl. No.: 13/612,859

(22) Filed: Sep. 13, 2012

(65) Prior Publication Data

US 2013/0201568 A1    Aug. 8, 2013

(30) Foreign Application Priority Data

Feb. 8, 2012    (TW) .............................. 101104093 A

(51) Int. Cl.
*G02B 9/60*    (2006.01)
*G02B 13/18*    (2006.01)

(52) U.S. Cl.
USPC ............................ 359/714; 359/708; 359/764

(58) Field of Classification Search
USPC ........................... 359/713, 714, 763, 764, 766
See application file for complete search history.

(56) References Cited

U.S. PATENT DOCUMENTS

| | | | |
|---|---|---|---|
| 7,969,664 B2 | 6/2011 | Tang et al. | |
| 8,000,031 B1 | 8/2011 | Tsai | |
| 8,179,615 B1 * | 5/2012 | Tang et al. | 359/714 |
| 8,456,758 B1 * | 6/2013 | Huang et al. | 359/714 |
| 2012/0087019 A1 * | 4/2012 | Tang et al. | 359/714 |
| 2012/0087020 A1 * | 4/2012 | Tang et al. | 359/714 |
| 2012/0105704 A1 * | 5/2012 | Huang et al. | 348/340 |
| 2013/0100542 A1 * | 4/2013 | Tsai et al. | 359/714 |

* cited by examiner

*Primary Examiner* — Evelyn A Lester
*Assistant Examiner* — William Alexander
(74) *Attorney, Agent, or Firm* — CKC & Partners Co., Ltd.

(57) ABSTRACT

An image capturing optical lens system includes, in order from an object side to an image side, a first lens element, a second lens element, a third lens element, a fourth lens element and a fifth lens element. The first lens element with positive refractive power has a convex object-side surface. The second lens element has negative refractive power. The third lens element with positive refractive power has a convex image-side surface. The fourth lens element with refractive power has a concave object-side surface and a convex image-side surface. The fifth lens element with refractive power is made of plastic material, and has a concave image-side surface, wherein the fifth lens element has at least one inflection point formed on at least one of the surfaces thereof. The surfaces of the third lens element, fourth lens element and fifth lens element are aspheric.

23 Claims, 25 Drawing Sheets

IMAGE CAPTURING OPTICAL LENS SYSTEM

RELATED APPLICATIONS

The application claims priority to Taiwan Application Serial Number 101104093, filed Feb. 8, 2012, which is herein incorporated by reference.

BACKGROUND

1. Technical Field

The present invention relates to an image capturing optical lens system. More particularly, the present invention relates to a compact image capturing optical lens system applicable to electronic products.

2. Description of Related Art

In recent years, with the popularity of mobile products with camera functionalities, the demand for miniaturizing an optical lens system is increasing. The sensor of a conventional photographing camera typically a CCD (Charge-Coupled Device) image sensor or a CMOS (Complementary Metal-Oxide-Semiconductor) sensor. As advanced semiconductor manufacturing technologies have allowed the pixel size of sensors to be reduced and compact optical lens systems have gradually evolved toward the field of higher megapixels, there is an increasing demand for compact optical lens systems featuring better image quality.

A conventional compact optical lens system employed in a portable electronic product mainly adopts a four-element lens structure. Due to the popularity of mobile products with high-end specifications, such as smart phones and PDAs (Personal Digital Assistants), the pixel and image-quality requirements of the compact optical lens system have increased rapidly. Thus, the conventional four-element lens structure cannot satisfy the requirements of the compact optical lens system.

Another conventional optical lens system provides a five-element lens structure. The optical lens system with five-element lens can increase the image quality and resolving power thereof. However, the positive refractive power of the third lens element of the optical lens system is marginal compared to the positive refractive power of the first lens element thereof, so that the third lens element cannot effectively balance the positive refractive power of the first lens element, and resulting relatively low yield of manufacture of the optical lens system. Therefore, a need exists in the art for providing an optical lens system for use in a mobile electronic product that has excellent imaging quality and high yield of manufacture.

SUMMARY

According to one aspect of the present disclosure, an image capturing optical lens system includes, in order from an object side to an image side, a first lens element, a second lens element, a third lens element, a fourth lens element and a fifth lens element. The first lens element with positive refractive power has a convex object-side surface. The second lens element has negative refractive power. The third lens element with positive refractive power has a convex image-side surface, wherein an object-side surface and the image-side surface of the third lens element are aspheric. The fourth lens element with refractive power has a concave object-side surface and a convex image-side surface, wherein the object-side surface and the image-side surface of the fourth lens element are aspheric. The fifth lens element with refractive power is made of plastic material, and has a concave image-side surface, wherein an object-side surface and the image-side surface of the fifth lens element are aspheric, and the fifth lens element has at least one inflection point formed on at least one of the object-side surface and the image-side surface thereof. The first through fifth lens elements are five independent and non-cemented lens elements. When a focal length of the image capturing optical lens system is f, a focal length of the first lens element is f1 a focal length of the third lens element is f3, an axial distance between the fourth lens element and the fifth lens element is T45, a central thickness of the fourth lens element is CT4, and a central thickness of the fifth lens element is CT5, the following relationships are satisfied:

$$0.25 < f/f3 - f/f1 < 0.85;$$

$$2.5 < (f1 - f3)/T45; \text{ and}$$

$$1.6 < CT5/CT4 < 6.0.$$

According to another aspect of the present disclosure, an image capturing optical lens system includes, in order from an object side to an image side, a first lens element, a second lens element, a third lens element, a fourth lens element and a fifth lens element. The first lens element with positive refractive power has a convex object-side surface. The second lens element has negative refractive power. The third lens element with positive refractive power has a convex image-side surface, wherein an object-side surface and the image-side surface of the third lens element are aspheric. The fourth lens element has refractive power, wherein an object-side surface and an image-side surface of the fourth lens element are aspheric. The fifth lens element with refractive power is made of plastic material, and has a concave image-side surface, wherein an object-side surface and the image-side surface of the fifth lens element are aspheric, and the fifth lens element has at least one inflection point formed on at least one of the object-side surface and the image-side surface thereof. When a focal length of the image capturing optical lens system is f, a focal length of the first lens element is f1, a focal length of the third lens element is f3, an axial distance between the second lens element and the third lens element is T23, an axial distance between the third lens element and the fourth lens element is T34, and an axial distance between the fourth lens element and the fifth lens element is T45, the following relationships are satisfied:

$$0.25 < f/f3 - f/f1 < 0.85;$$

$$2.5 < (f1 - f3)/T45; \text{ and}$$

$$0.1 < T23/T34 < 1.0.$$

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
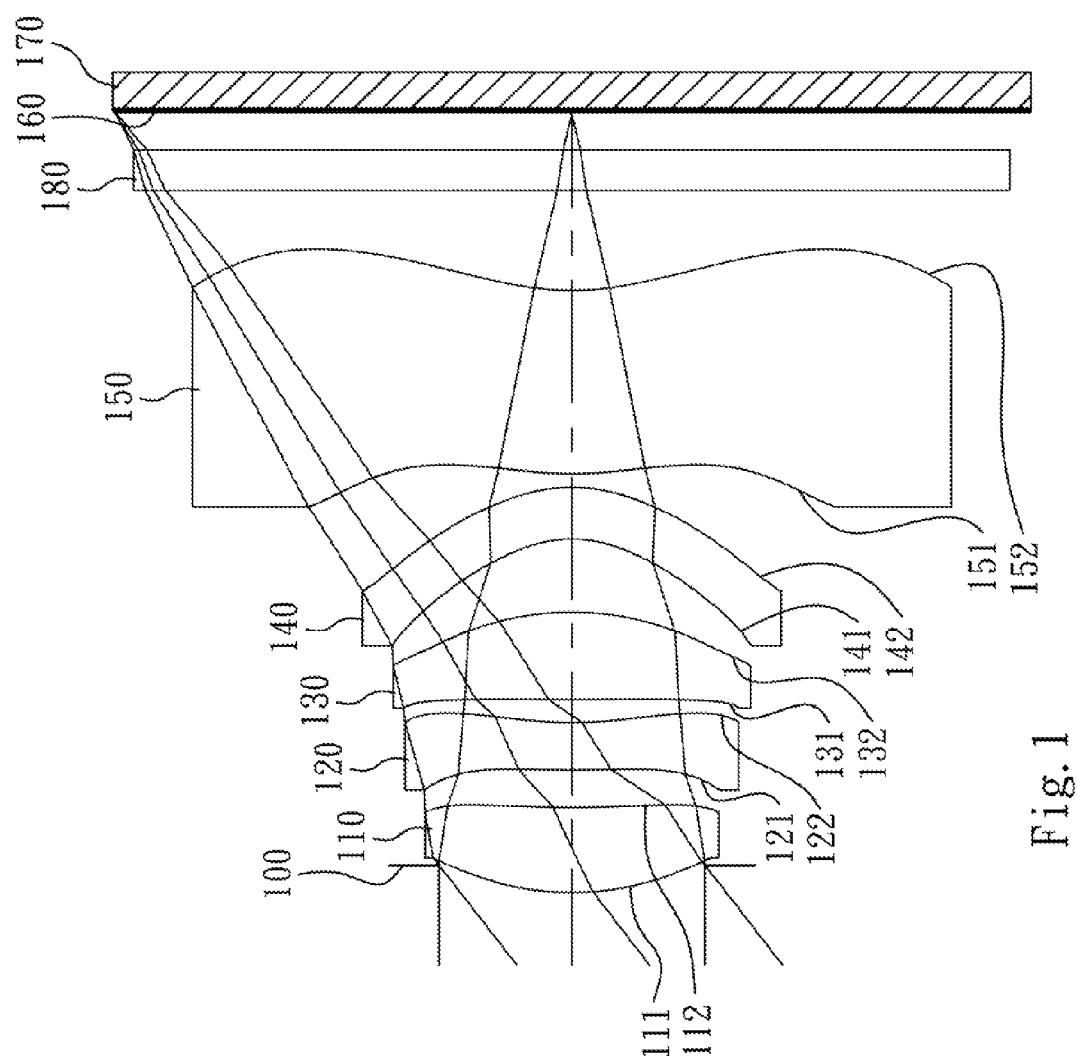
FIG. 1 is a schematic view of an image capturing optical lens system according to the 1st embodiment of the present disclosure.

An image capturing optical lens system includes, in order from an object side to an image side, a first lens element, a second lens element, a third lens element, a fourth lens element, and a fifth lens element. The image capturing optical lens system further includes an image sensor located on an image plane.

The first through fifth lens elements are five independent and non-cemented lens elements. That is, any two lens elements adjacent to each other are not cemented, and there is an air space between the two lens elements. The manufacture of the cemented lenses is more complex than the manufacture of the non-cemented lenses. Especially, the cemented surfaces of the two lens elements should have accurate curvatures for ensuring the connection between the two lens elements, and the space between the cemented surfaces of the two lens elements during cementing the lens elements may affect the optical quality of the image capturing optical lens system. Therefore, the image capturing optical lens system of the present disclosure provides five independent and non-cemented lens elements for improving the problem generated by the cemented lens elements.

The first lens element with positive refractive power has a convex object-side surface, so that the positive refractive power of the first lens element can be enhanced for reducing the total track length of the image capturing optical lens system. When the first lens element has a concave image-side surface, the astigmatism of the image capturing optical lens system can be corrected for increasing the image quality thereof.

The second lens element with negative refractive power has a concave image-side surface, so that the aberration generated from the first lens element can be corrected.

The third lens element with positive refractive power provides the positive refractive power for reducing the sensitivity of the image capturing optical lens system while increasing the yield of manufacture. The third lens element has a convex image-side surface which can adjust the positive refractive power of the image capturing optical lens system.

The fourth lens element with negative refractive power has a concave object-side surface and a convex image-side surface, so that the high order aberration and the astigmatism of the image capturing optical lens system can be corrected.

The fifth lens element has a convex object-side surface and a concave image-side surface, so that the principal point of the image capturing optical lens system can be positioned away from the image plane, and the total track length of the image capturing optical lens system can be reduced so as to maintain the compact size thereof. Furthermore, the fifth lens element has at least one inflection point formed on at least one of the object-side surface and the image-side surface thereof, so that the incident angle of the off-axis field on the image sensor can be effectively minimized and the aberration can be corrected as well.

When a focal length of the image capturing optical lens system is f, a focal length of the first lens element is f1, and a focal length of the third lens element is f3, the following relationship is satisfied:

$0.25 < f/f3 - f/f1 < 0.85.$

By foregoing arrangement, the distribution of the positive refractive power of the image capturing optical lens system is proper, so that the spherical aberration can be controlled, and the sensitivity can be reduced for increasing the yield of manufacture of the image capturing optical lens system.

When the focal length of the first lens element is f1, the focal length of the third lens element is f3, and an axial distance between the fourth lens element and the fifth lens element is T45, the following relationship is satisfied:

$2.5 < (f1 - f3)/T45.$

Therefore, the distribution of the positive refractive power of the image capturing optical lens system is proper for reducing the sensitivity thereof, and further increasing the yield of the manufacture thereof. Furthermore, the total track length can be effectively reduced by adjusting the distance between the fourth lens element and the fifth lens element.

When a central thickness of the fourth lens element is CT4, and a central thickness of the fifth lens element is CT5, the following relationship is satisfied:

$$1.6 < CT5/CT4 < 6.0.$$

Therefore, the thickness between the fourth lens element and the fifth lens element is proper, and the manufacture of the lens elements and the fabrication of the image capturing optical lens system can be easier.

When an Abbe number of the second lens element is V2, and an Abbe number of the third lens element is V3, the following relationship is satisfied:

$$0 \leq V3 - V2 < 50.$$

Therefore, the chromatic aberration of the image capturing optical lens system can be corrected.

When the focal length of the image capturing optical lens system is f, to focal length of the fourth lens element is f4, and a focal length of the fifth lens element is f5, the following relationship is satisfied:

$$0 < |f/f4| + |f/f5| < 1.5.$$

Therefore, the refractive power of the fourth lens element and the fifth lens element are proper, and the high order aberration and astigmatism of the image capturing optical lens system can be corrected for enhancing the resolving power thereof.

Furthermore, f, f4 and f5 can satisfy the following relationship:

$$0 < |f/f4| + |f/f5| < 1.0.$$

When a curvature radius of an object-side surface of the second lens element is R3, and a curvature radius of an image-side surface of the second lens element is R4, the following relationship is satisfied:

$$0.2 < (R3 - R4)/(R3 + R4) < 1.5.$$

Therefore, the second lens element can correct the aberration of the image capturing optical lens system by adjusting the curvature of the surfaces of the second lens element.

When a curvature radius of the object-side surface of the third lens element is R5, and a curvature radius of the image-side surface of the third lens element is R6, the following relationship is satisfied:

$$0.3 < (R5 + R6)/(R5 - R6) < 1.0.$$

Therefore, the positive refractive power is proper by adjusting the curvature of the surfaces of the third lens element, and the sensitivity of the image capturing optical lens system can be reduced.

When an axial distance between the object-side surface of the first lens element and an image plane is TTL, and a maximum image height of the image capturing optical lens system is ImgH the following relationship is satisfied:

$$TTL/ImgH < 1.85.$$

Therefore, the total track length of the image capturing optical lens system can be reduced so as to maintain the compact size of the image capturing optical lens system for portable electronic products.

The image capturing optical lens system further includes a stop such as an aperture stop, wherein when an axial distance between the stop and the image-side surface of the fifth lens element is SD, and an axial distance between the object-side surface of the first lens element and the image-side surface of the fifth lens element is TD, the following relationship is satisfied:

$$0.75 < SD/TD < 1.2.$$

Therefore, the image capturing optical lens system has a favorable balance between the telecentric and wide-angle characteristics, and a desirable total track length of the image capturing optical lens system can be maintained.

When the focal length of the image capturing optical lens system is f, and the focal length of the third lens element is f3, the following relationship is satisfied:

$$0.7 < f/f3 < 1.8.$$

Therefore, the sensitivity of the image capturing optical lens system can be reduced by the refractive power of the third lens element.

When the focal length of the image capturing optical lens system is f, the central thickness of the fourth lens element is CT4, and a distance in parallel with an optical axis from a maximum effective diameter position to an axial vertex on the image-side surface of the fourth lens element is SAG42, the following relationship is satisfied:

$$-22 < (CT4 + SAG42) \times 100/f < 0.$$

Therefore, the surface shape of the fourth lens element can reduce the space between the lens elements during the fabrication. Moreover, the fabrication of the image capturing optical lens system can be easier by the proper thickness of the fourth lens element.

Furthermore, f, CT4 and SAG42 can satisfy the following relationship:

$$-15 < (CT4 + SAG42) \times 100/f < -4.$$

When an axial distance between the second lens element and the third lens element is T23, and an axial distance between the third lens element and the fourth lens element is T34, the following relationship is satisfied:

$$0.1 T21/T34 < 1.0.$$

Therefore, the distance between the second lens element and the third lens element and the distance between the third lens element and the fourth lens element are proper for fabricating the lens elements, and the total track length of the image capturing optical lens system can be reduced.

According to the image capturing optical lens system of the present disclosure, the lens elements thereof can be made of glass or plastic material. When the lens elements are made of glass material, the distribution of the refractive power of the image capturing optical lens system may be more flexible to design. When the lens elements are made of plastic material, the cost of manufacture can be effectively reduced. Furthermore, the surface of each lens element can be aspheric, so that it is easier to make the surface into non-spherical shapes. Consequently, more controllable variables are obtained, and the aberration as well as the number of required lens elements can be reduced while constructing an optical system. Therefore, the total track length of the image capturing optical lens system can also be reduced.

According to the image capturing optical lens system of the present disclosure, when the lens element has a convex surface, it indicates that the paraxial region of the surface is convex; and when the lens element has a concave surface, it indicates that the paraxial region of the surface is concave.

According to the image capturing optical lens system of the present disclosure, the image capturing optical lens system can include at least one stop, such as an aperture stop, glare stop, field stop, etc. Said glare stop or said field stop is allocated for reducing stray light while retaining high image quality. Furthermore, when the stop is an aperture stop, the position of the aperture stop within an optical system can be arbitrarily placed in front of the entire lens assembly, within the lens assembly, or in front of the image plane in accordance with the preference of the optical designer, in order to achieve the desirable optical features or higher image quality produced from the lens assembly.

According to the above description of the present disclosure, the following 1st-12th specific embodiments are provided for further explanation.

1st Embodiment

Figure 2:
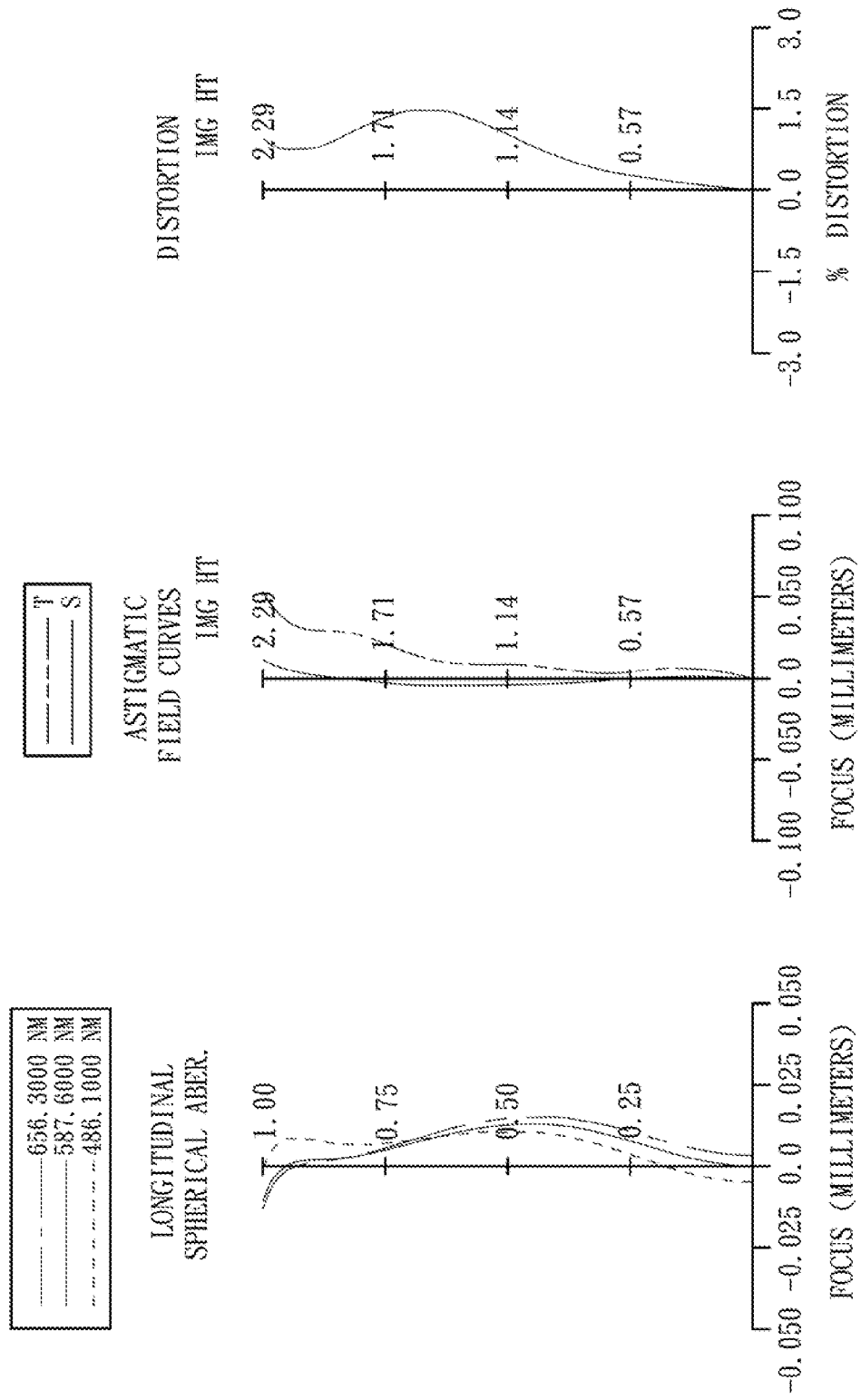
FIG. 2 shows spherical aberration curves, astigmatic field curves and a distortion curve of the image capturing optical lens system according to the 1st embodiment.

FIG. 1 is a schematic view of an image capturing optical lens system according to the 1st embodiment of the present disclosure. FIG. 2 shows spherical aberration curves, astigmatic field curves and a distortion curve of the image capturing optical lens system according to the 1st embodiment. In FIG. 1, the image capturing optical lens system includes, in order from an object side to an image side, an aperture stop 100, the first lens element 110, the second lens element 120, the third lens element 130, the fourth lens element 140, the fifth lens element 150, an IR-cut filter 180, an image plane 160 and an image sensor 170.

The first lens element 110 with positive refractive power has a convex object-side surface 111 and a concave image-side surface 112, and is made of plastic material. The object-side surface 111 and the image-side surface 112 of the first lens element 110 are aspheric.

The second lens element 120 with negative refractive power has a convex object-side surface 121 and a concave image-side surface 122, and is made of plastic material. The object-side surface 121 and the image-side surface 122 of the second lens element 120 are aspheric.

The third lens element 130 with positive refractive power has a convex object-side surface 131 and a convex image-side surface 132, and is made of plastic material. The object-side surface 131 and the mage-side surface 132 of the third lens element 130 are aspheric.

The fourth lens element 140 with negative refractive power has a concave object-side surface 141 and a convex image-side surface 142, and is made of plastic material. The object-side surface 141 and the image-side surface 142 of the fourth lens element 140 are aspheric.

The fifth lens element 150 with negative refractive power has a convex object-side surface 151 and a concave image-side surface 152, and is made of plastic material. The object-side surface 151 and the image-side surface 152 of the fifth lens element 150 are aspheric. Furthermore, the fifth lens element 150 has inflection points formed on the object-side surface 151 and the image-side surface 152 thereof.

The IR-cut filter 180 is made of glass, and located between the fifth lens element 150 and the image plane 160, and will not affect the focal length of the image capturing optical lens system.

The equation of the aspheric surface profiles of the aforementioned lens elements of the 1st embodiment is expressed as follows:

$$X(Y) = (Y^2/R)/(1+sqrt(1-(1+k)\times(Y/R)^2)) + \sum_i (Ai)\times(Y^i)$$

Wherein,

X is the distance of a point on the aspheric surface spaced at a distance Y from the optical axis relative to the tangential plane at the aspheric surface vertex on the optical axis;

Y is the distance from the point on the curve of the aspheric ce to the optical axis;

R is the curvature radius;

k is the conic coefficient; and

Ai is the i-th aspheric coefficient.

In the image capturing optical lens system according to the 1st embodiment, when a focal length of the image capturing optical lens system is f, an f-number of the image capturing optical lens system is Fno, and half of the maxi field of view is HFOV, these parameters have the following values:

f=2.91 mm;

Fno=2.20; and

HFOV=37.8 degrees.

In the image capturing optical lens system according to the 1st embodiment, when an Abbe number of the second lens element 120 is V2, an Abbe number of the third lens element 130 is V3, and the following relationship is satisfied:

$$V3-V2=32.6.$$

In the image capturing optical lens system according to the 1st embodiment, when a central thickness of the fourth lens element 140 is CT4, and a central thickness of the fifth lens element 150 is CT5, the following relationship is satisfied:

$$CT5/CT4=3.50.$$

In the image capturing optical lens system according to the 1st embodiment, when an axial distance between the second lens element 120 and the third lens element 130 is T23, and an axial distance between the third lens element 130 and the fourth lens element 140 is T34, the following relationship is satisfied:

$$T23/T34=0.31.$$

Figure 25:
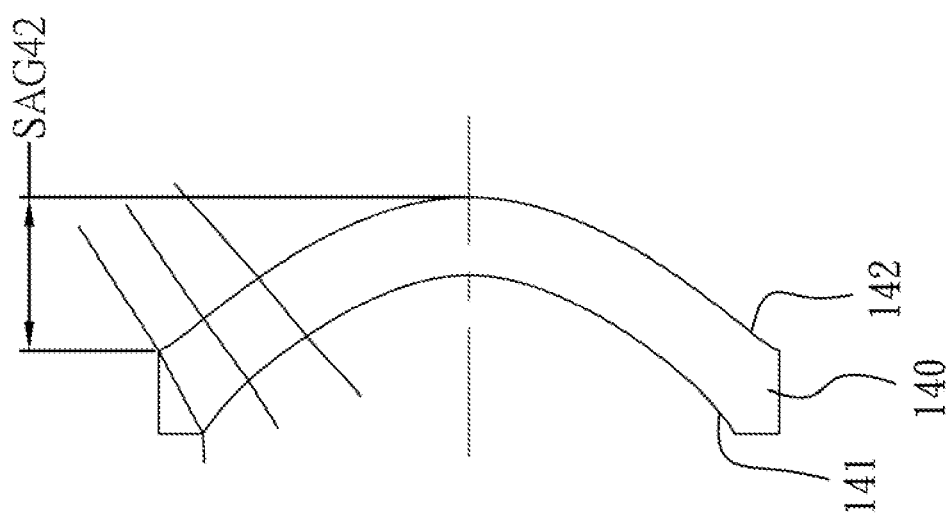
FIG. 25 is a schematic view of the fourth lens element of FIG. 1 showing the location of SAG42 measurement.

FIG. 25 is a schematic view of the fourth lens element of FIG. 1 showing the location of SAG42 measurement. In FIG. 25, a distance in parallel with an optical axis from a maximum effective diameter position to an axial vertex on the image-side surface 142 of the fourth lens element 140 is SAG42, the focal length of the image capturing optical lens system is f, the central thickness of the fourth lens element 140 is CT4, the following relationship is satisfied:

$$(CT4+SAG42)\times100/f=-8.81.$$

In the image capturing optical lens system according to the 1st embodiment, when a curvature radius of an object-side surface 121 of the second lens element 120 is R3, a curvature radius of an image-side surface 122 of the second lens element 120 is R4, a curvature radius of the object-side surface 131 of the third lens element 130 is R5, a curvature radius of the image-side surface 132 of the third lens element 130 is R6, and the following relationships are satisfied:

$$(R3-R4)/(R3+R4)=0.47; \text{ and}$$

$$(R5+R6)/(R5-R6)=0.76.$$

In the image capturing optical lens system according to the 1st embodiment, when the focal length of the image capturing optical lens system is f, a focal length of the first lens element 110 is f1, a focal length of the third lens element 130 is f3, a focal length of the fourth lens element 140 is f4, a focal length of the fifth lens element 150 is f5, and an axial distance between the fourth lens element 140 and the fifth lens element 150 is T45, the following relationships are satisfied:

$f/f3 = 1.20;$ $f/f3 - f/f1 = 0.33;$ $|f/f4| + |f/f5| = 0.62;$ and $(f1 - f3)/T45 = 13.28.$ In the image capturing optical lens system according to the 1st embodiment, when an axial distance between the aperture stop 100 and the image-side surface 152 of the fifth lens element 150 is SD, and an axial distance between the object-side surface 111 of the first lens element 110 and the image-side surface 152 of the fifth lens element 150 is TD, the following relationship is satisfied:

$SD/TD = 0.95.$

In the image capturing optical lens system according to the 1st embodiment, when an axial distance between the object-side surface 111 of the first lens element 110 and the image plane 160 is TTL, a maximum image height of the image capturing optical lens system is ImgH which here is a half of the diagonal length of the photosensitive area of the image sensor 170 on the image plane 160, and the following relationship is satisfied:

$TTL/ImgH = 1.68.$

The detailed optical data of the 1st embodiment are shown in Table 1 and the aspheric surface data are shown in Table 2 below.

TABLE 1

1st Embodiment
f = 2.91 mm, Fno = 2.20, HFOV = 37.8 deg.

| Surface # | | Curvature Radius | Thickness | Material | Index | Abbe # | Focal length |
|---|---|---|---|---|---|---|---|
| 0 | Object | Plano | Infinity | | | | |
| 1 | Ape. Stop | Plano | −0.138 | | | | |
| 2 | Lens 1 | 1.396560 (ASP) | 0.424 | Plastic | 1.544 | 55.9 | 3.32 |
| 3 | | 5.492400 (ASP) | 0.186 | | | | |
| 4 | Lens 2 | 5.261600 (ASP) | 0.240 | Plastic | 1.640 | 23.3 | −4.78 |
| 5 | | 1.899360 (ASP) | 0.111 | | | | |
| 6 | Lens 3 | 10.770900 (ASP) | 0.439 | Plastic | 1.544 | 55.9 | 2.42 |
| 7 | | −1.477120 (ASP) | 0.362 | | | | |
| 8 | Lens 4 | −0.590720 (ASP) | 0.260 | Plastic | 1.640 | 23.3 | −7.37 |
| 9 | | −0.791370 (ASP) | 0.068 | | | | |
| 10 | Lens 5 | 1.988570 (ASP) | 0.910 | Plastic | 1.544 | 55.9 | −12.92 |
| 11 | | 1.300210 (ASP) | 0.500 | | | | |
| 12 | IR-cut filter | Plano | 0.200 | Glass | 1.517 | 64.2 | — |
| 13 | | Plano | 0.199 | | | | |
| 14 | Image | Plano | — | | | | |

Note:
Reference wavelength (d-line) is 587.6 nm.

TABLE 2

Aspheric Coefficients

| | Surface # | | | | |
|---|---|---|---|---|---|
| | 2 | 3 | 4 | 5 | 6 |
| k = | −1.86826E−01 | 1.65184E+01 | −6.69590E+01 | −1.65136E+01 | −7.87999E+01 |
| A4 = | −6.45050E−03 | −1.78855E−01 | −5.45230E−01 | −2.73597E−01 | −1.99372E−01 |
| A6 = | 8.67930E−02 | 1.06317E−01 | 6.90632E−01 | 3.77405E−01 | 5.67877E−02 |
| A8 = | −3.88475E−01 | −4.07282E−01 | −1.69563E+00 | −5.27142E−01 | 5.70555E−01 |
| A10 = | 7.99259E−01 | −1.69731E−01 | 1.18784E+00 | 6.10106E−02 | −3.82549E−01 |
| A12 = | −1.10184E+00 | 2.45857E−02 | −4.66058E−02 | −3.73841E−02 | −1.70491E+00 |
| A14 = | 8.55184E−02 | −1.22676E−01 | 7.84948E−02 | 1.52830E−02 | 2.94968E+00 |
| A16 = | | | | | −1.81800E+00 |

| | Surface # | | | | |
|---|---|---|---|---|---|
| | 7 | 8 | 9 | 10 | 11 |
| k = | 1.37305E+00 | −2.41951E+00 | −7.12133E−01 | −2.02890E+01 | −7.17058E+00 |
| A4 = | 5.78712E−03 | 9.10317E−02 | 4.06938E−01 | −2.30571E−01 | −8.37357E−02 |
| A6 = | −7.34593E−03 | −7.80031E−01 | −3.68698E−01 | 9.09053E−02 | 3.99842E−02 |
| A8 = | 1.13990E−01 | 1.39546E+00 | 1.27351E−01 | −5.07597E−02 | −1.96900E−02 |
| A10 = | 6.62557E−01 | −1.17401E+00 | 2.16695E−01 | 1.34320E−02 | 5.76265E−03 |
| A12 = | −5.25303E−01 | 1.89653E−01 | −1.22077E−01 | 5.90950E−03 | −9.74145E−04 |
| A14 = | −2.83927E−05 | 4.02431E−01 | −1.53401E−01 | −3.18694E−04 | 7.55284E−05 |
| A16 = | | −4.23905E−01 | 1.28551E−01 | −7.25606E−04 | |

In Table 1 the curvature radius, the thickness and the focal length are shown in millimeters (mm). Surface numbers 0-14 represent the surfaces sequentially arranged from the object-side to the mage-side along the optical axis. In Table 2, k represents the conic coefficient of the equation of the aspheric surface profiles. A1-A16 represent the aspheric coefficients ranging from the 1st order to the 16th order. This information related to Table 1 and Table 2 applies also to the Tables for the remaining embodiments, and so an explanation in this regard will not be provided again.

2nd Embodiment

Figure 3:
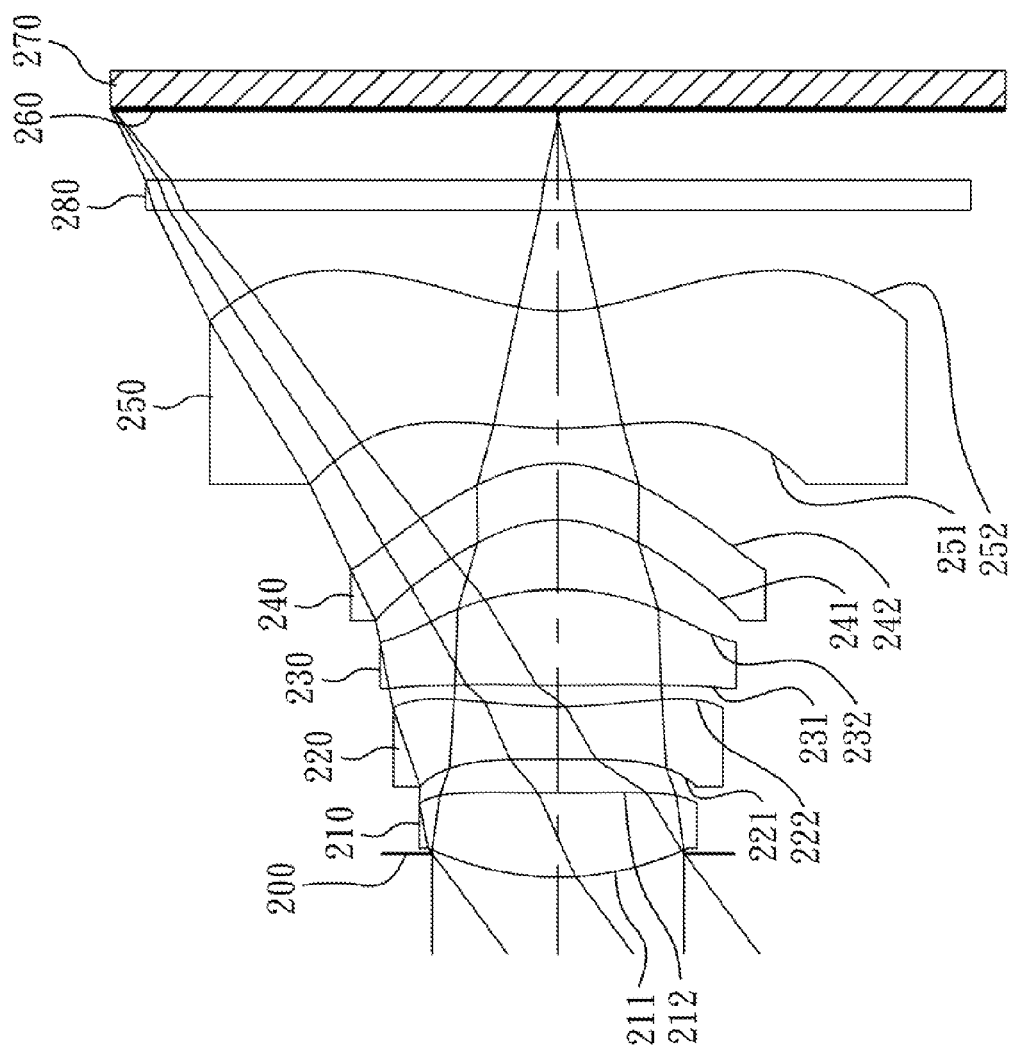
FIG. 3 is a schematic view of an image capturing optical lens system according to the 2nd embodiment of the present disclosure.
Figure 4:
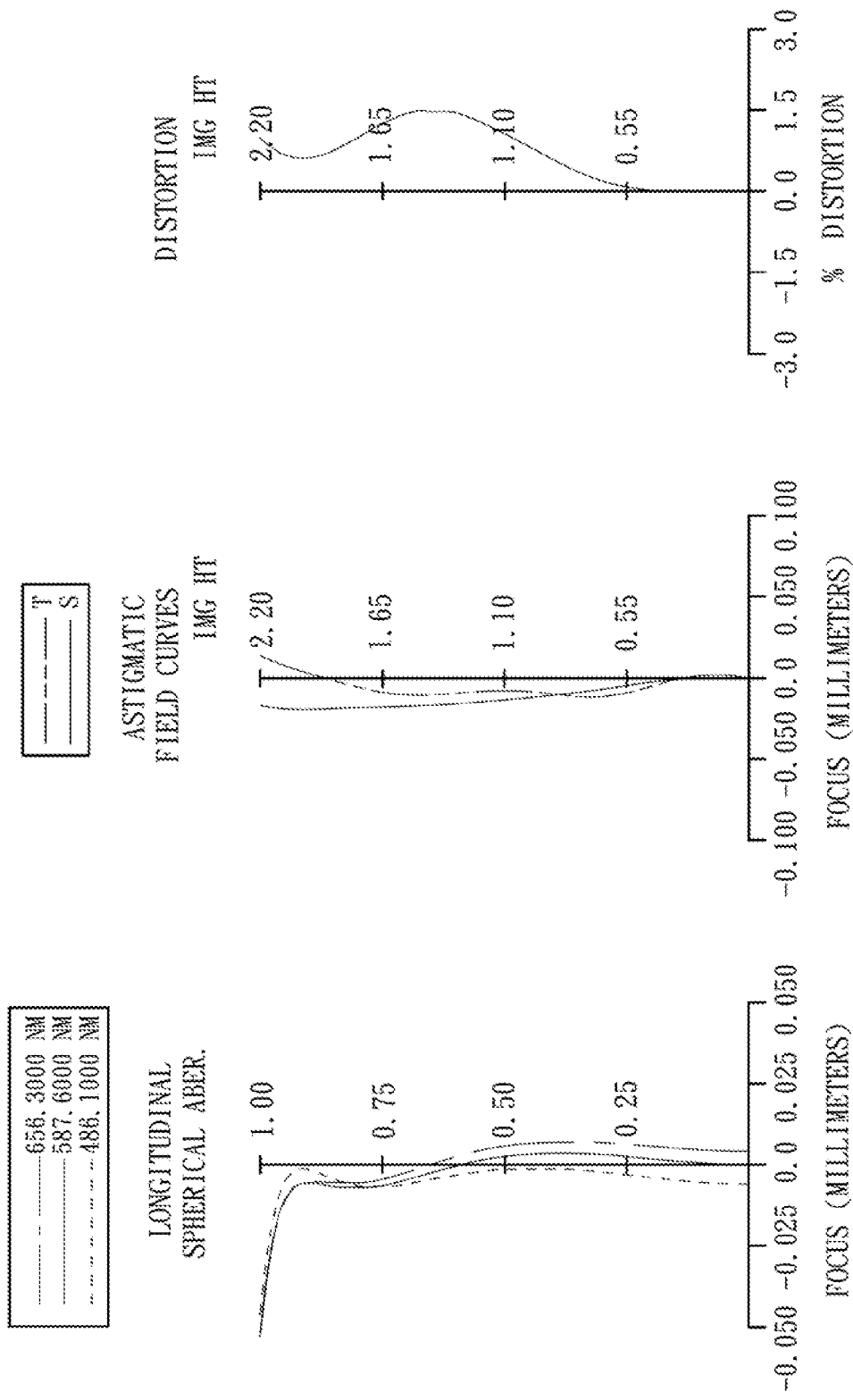
FIG. 4 shows spherical aberration curves, astigmatic field curves and a distortion curve of the image capturing optical lens system according to the 2nd embodiment.

FIG. 3 is a schematic view of an image capturing optical lens system according to the 2nd embodiment of the present disclosure. FIG. 4 shows spherical aberration curves, astigmatic field curves and a distortion curve of the image capturing optical lens system according to the 2nd embodiment. In FIG. 3, the image capturing optical lens system includes, in order from an object side to an image side, an aperture stop 200, the first lens element 210, the second lens element 220, the third lens element 230, the fourth lens element 240, the fifth lens element 250, an IR-cut filter 280, an image plane 260 and an image sensor 270.

The first lens element 210 with positive refractive power has a convex object-side surface 211 and a concave image-side surface 212, and is made of plastic material. The object-side surface 211 and the image-side surface 212 of the first lens element 210 are aspheric.

The second lens element 220 with negative refractive power has a concave object-side surface 221 and a concave image-side surface 222, and is made of plastic material. The object-side surface 221 and the image-side surface 222 of the second lens element 220 are aspheric.

The third lens element 230 with positive refractive power has a convex object-side surface 231 and a convex image-side surface 232, and is made of plastic material. The object-side surface 231 and the image-side surface 232 of the third lens element 230 are aspheric.

The fourth lens element 240 with positive refractive power has a concave object-side surface 241 and a convex image-side surface 242, and is made of plastic material. The object-side surface 241 and the image-side surface 242 of the fourth lens element 240 are aspheric.

The fifth lens element 250 with negative refractive power has a convex object-side surface 251 and a concave image-side surface 252, and is made of plastic material. The object-side surface 251 and the image-side surface 252 of the fifth lens element 250 are aspheric. Furthermore, the fifth lens element 250 has inflection points formed on the object-side surface 251 and the image-side surface 252 thereof.

The IR-cut filter 280 is made of glass, and located between the fifth lens element 250 and the image plane 260, and will not affect the focal length of the image capturing optical lens system.

The detailed optical data of the 2nd embodiment are shown in Table 3 and the aspheric surface data are shown in Table 4 below.

TABLE 3

2nd Embodiment
f = 2.93 mm, Fno = 2.35, HFOV = 36.7 deg.

| Surface # | | Curvature Radius | Thickness | Material | Index | Abbe # | Focal length |
|---|---|---|---|---|---|---|---|
| 0 | Object | Plano | Infinity | | | | |
| 1 | Ape. Stop | Plano | −0.119 | | | | |
| 2 | Lens 1 | 1.454110 (ASP) | 0.416 | Plastic | 1.544 | 55.9 | 2.93 |
| 3 | | 14.904200 (ASP) | 0.166 | | | | |
| 4 | Lens 2 | −68.965500 (ASP) | 0.260 | Plastic | 1.634 | 23.8 | −3.27 |
| 5 | | 2.141460 (ASP) | 0.106 | | | | |
| 6 | Lens 3 | 9.244400 (ASP) | 0.475 | Plastic | 1.544 | 55.9 | 2.21 |
| 7 | | −1.357020 (ASP) | 0.343 | | | | |
| 8 | Lens 4 | −0.630010 (ASP) | 0.280 | Plastic | 1.544 | 55.9 | 27.72 |
| 9 | | −0.699470 (ASP) | 0.173 | | | | |
| 10 | Lens 5 | 2.155120 (ASP) | 0.580 | Plastic | 1.535 | 56.3 | −3.65 |
| 11 | | 0.927940 (ASP) | 0.500 | | | | |
| 12 | IR-cut filter | Plano | 0.150 | Glass | 1.517 | 64.2 | — |
| 13 | | Plano | 0.349 | | | | |
| 14 | Image | Plano | — | | | | |

Note:
Reference wavelength (d-line) is 587.6 nm.

TABLE 4

Aspheric Coefficients

| | Surface # | | | | |
|---|---|---|---|---|---|
| | 2 | 3 | 4 | 5 | 6 |
| k = | −1.19189E−01 | −1.00000E+00 | −1.00000E+00 | −2.62139E+01 | 3.00000E+00 |
| A4 = | 2.83800E−03 | −1.36630E−01 | −5.71493E−01 | −2.44833E−01 | −2.36530E−01 |
| A6 = | 5.88342E−02 | −4.28918E−02 | 6.66416E−01 | 3.84414E−01 | 8.15810E−02 |
| A8 = | −2.70836E−01 | −1.20364E−01 | −1.63486E+00 | −5.83511E−01 | 6.25944E−01 |
| A10 = | 6.94897E−01 | −7.60301E−01 | 5.35974E−01 | 3.01572E−03 | −4.22372E−01 |
| A12 = | −1.68947E+00 | −1.06898E+00 | −1.21658E+00 | −5.19946E−04 | −1.68576E+00 |
| A14 = | 8.21146E−02 | −1.29541E−01 | 7.48578E−02 | 5.49395E−02 | 2.97235E+00 |
| A16 = | | | | | −1.60448E+00 |

TABLE 4-continued

Aspheric Coefficients

| Surface # | | | | |
|---|---|---|---|---|
| 7 | 8 | 9 | 10 | 11 |
| k = 9.39146E−01 | −2.19612E+00 | −7.55580E−01 | −3.00000E+01 | −6.82458E+00 |
| A4 = 1.70485E−02 | 8.75181E−02 | 4.89289E−01 | −2.47389E−01 | −1.20002E−01 |
| A6 = −3.59319E−02 | −7.21832E−01 | −3.66471E−01 | 6.51623E−02 | 5.01550E−02 |
| A8 = 1.11889E−01 | 1.45522E+00 | 1.23096E−01 | −4.38007E−02 | −2.24373E−02 |
| A10 = 6.88362E−01 | −1.16340E+00 | 2.23102E−01 | 1.20796E−02 | 5.66814E−03 |
| A12 = −4.63342E−01 | 8.50274E−02 | −1.08355E−01 | 2.56258E−03 | −8.55173E−04 |
| A14 = 7.36339E−02 | 4.31410E−01 | −1.46008E−01 | −1.23052E−03 | 7.07758E−05 |
| A16 = | −3.23651E−01 | 1.09012E−01 | 8.02072E−04 | |

In the image capturing optical lens system according to the 2nd embodiment, the definitions of f, Fno, HFOV, V2, V3, CT4, CT5, T23, T34, T45, SAG42, R3, R4, R5, R6, f1, f3, f4, f5, SD, TD, TTL and ImgH are the same as those stated in the 1st embodiment with corresponding values for the 2nd embodiment. Moreover, these parameters can be calculated from Table 3 and Table 4 as the following values and satisfy the following relationships:

| | | | |
|---|---|---|---|
| f (mm) | 2.93 | (R5 + R6)/(R5 − R6) | 0.74 |
| Fno | 2.35 | f/f3 | 1.32 |
| HFOV (deg.) | 36.7 | f/f3 − f/f1 | 0.33 |
| V3 − V2 | 32.1 | \|f/f4\| + \|f/f5\| | 0.91 |
| CT5/CT4 | 2.07 | (f1 − f3)/T45 | 4.16 |
| T23/T34 | 0.31 | SD/TD | 0.96 |
| (CT4 + SAG42) * 100/f | −8.49 | TTL/ImgH | 1.70 |
| (R3 − R4)/(R3 + R4) | 1.06 | | |

3rd Embodiment

Figure 5:
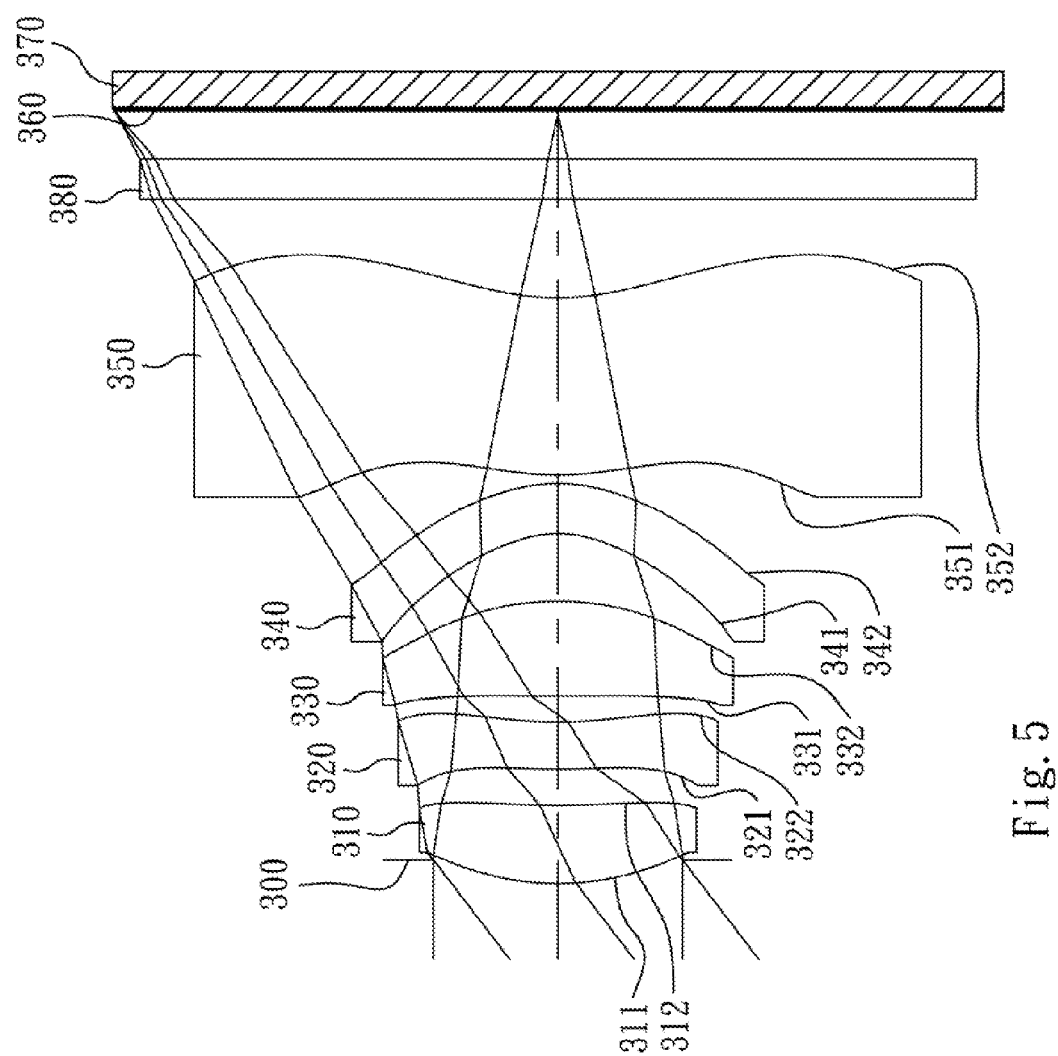
FIG. 5 is a schematic view of an image capturing optical lens system according to the 3rd embodiment of the present disclosure.
Figure 6:
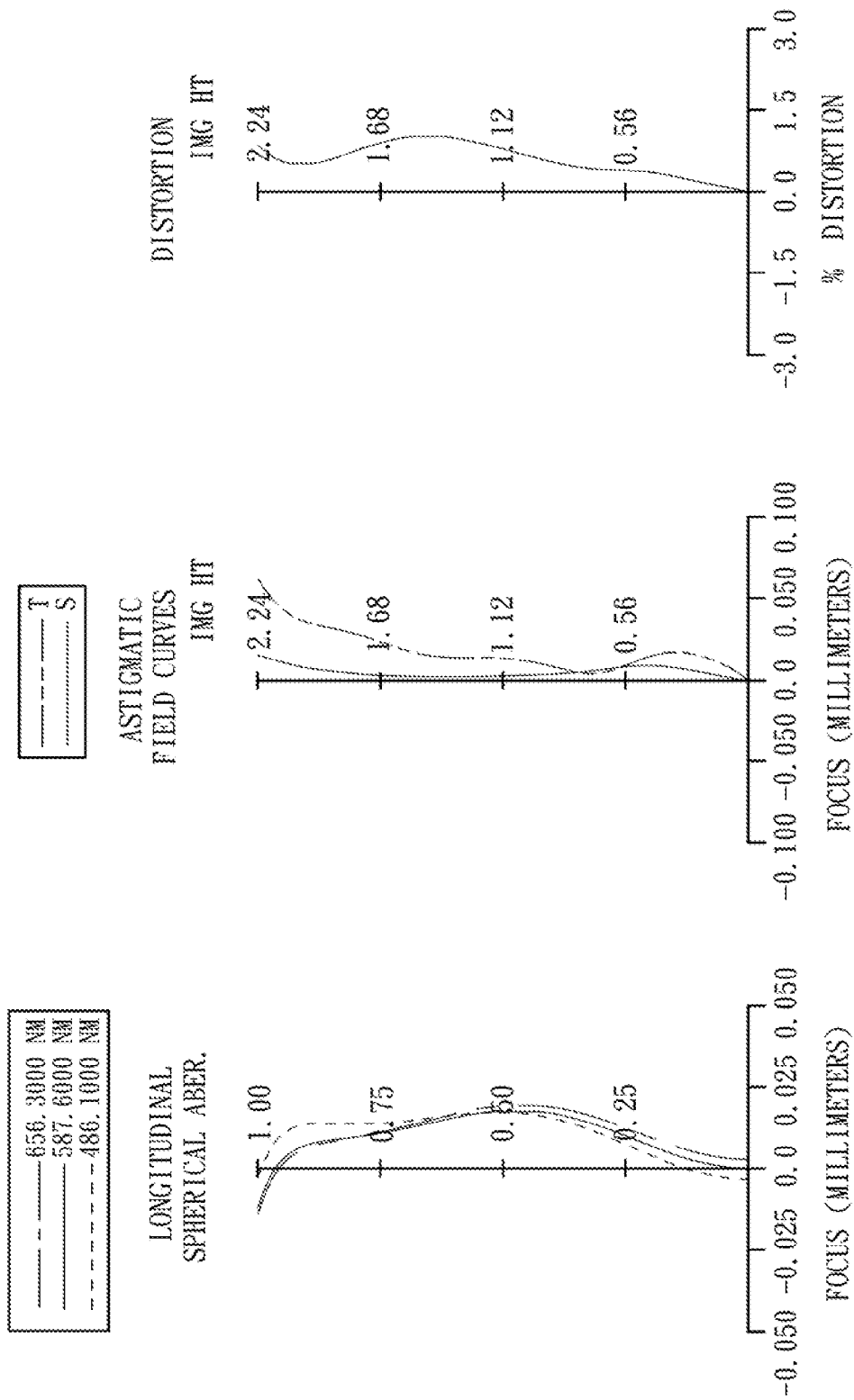
FIG. 6 shows spherical aberration curves, astigmatic field curves and a distortion curve of the image capturing optical lens system according to the 3rd embodiment.

FIG. 5 is a schematic view of an image capturing optical lens system according to the 3rd embodiment of the present disclosure. FIG. 6 shows spherical aberration curves, astigmatic field curves and a distortion curve of the image capturing optical lens system according to the 3rd embodiment. In FIG. 5, the image capturing optical lens system includes, in order from an object side to an image side, an aperture stop 300, the first lens element 310 the second lens element 320, the third lens element 330, the fourth lens element 340, the fifth lens element 350, an IR-cut filter 380, an image plane 360 and an image sensor 370.

The first lens element 310 with positive refractive power has a convex object-side surface 311 and a concave image-side surface 312, and is made of plastic material. The object-side surface 311 and the image-side surface 312 of the first lens element 310 are aspheric.

The second lens element 320 with negative refractive power has a convex object-side surface 321 and a concave image-side surface 322, and is) made of plastic material. The object-side surface 321 and the image-side surface 322 of the second lens element 320 are aspheric.

The third lens element 330 with positive refractive power has a convex object-side surface 331 and a convex image-side surface 332, and is made of plastic material. The object-side surface 331 and the image-side surface 332 of the third lens element 330 are aspheric.

The fourth lens element 340 with negative refractive power has a concave object-side surface 341 and a convex image-side surface 342, and is made of plastic material. The object-side surface 341 and the image-side surface 342 of the fourth lens element 340 are aspheric.

The fifth lens element 350 with positive refractive power has a convex object-side surface 351 and a concave image-side surface 352, and is made of plastic material. The object-side surface 351 and the image-side surface 352 of the fifth lens element 350 are aspheric. Furthermore, the fifth lens element 350 has inflection points formed on the object-side surface 351 and the image-side surface 352 thereof.

The IR-cut filter 380 is made of glass, and located between the fifth lens element 350 and the image plane 360, and will not affect the focal length of the image capturing optical lens system.

The detailed optical data of the 3rd embodiment are shown in Table 5 and the aspheric surface data are shown in Table 6 below.

TABLE 5

3rd Embodiment
f = 2.88 mm, Fno = 2.30, HFOV = 37.5 deg.

| Surface # | | Curvature Radius | Thickness | Material | Index | Abbe # | Focal length |
|---|---|---|---|---|---|---|---|
| 0 | Object | Plano | Infinity | | | | |
| 1 | Ape. Stop | Plano | −0.120 | | | | |
| 2 | Lens 1 | 1.393730 (ASP) | 0.394 | Plastic | 1.544 | 55.9 | 3.41 |
| 3 | | 5.040000 (ASP) | 0.182 | | | | |
| 4 | Lens 2 | 4.371200 (ASP) | 0.240 | Plastic | 1.640 | 23.3 | −5.49 |
| 5 | | 1.904900 (ASP) | 0.129 | | | | |
| 6 | Lens 3 | 15.997500 (ASP) | 0.480 | Plastic | 1.544 | 55.9 | 2.48 |
| 7 | | −1.456730 (ASP) | 0.338 | | | | |
| 8 | Lens 4 | −0.566020 (ASP) | 0.255 | Plastic | 1.640 | 23.3 | −4.31 |
| 9 | | −0.837170 (ASP) | 0.044 | | | | |
| 10 | Lens 5 | 1.435310 (ASP) | 0.889 | Plastic | 1.544 | 55.9 | 33.06 |
| 11 | | 1.219310 (ASP) | 0.500 | | | | |
| 12 | IR-cut filter | Plano | 0.200 | Glass | 1.517 | 64.2 | — |

TABLE 5-continued

3rd Embodiment
f = 2.88 mm, Fno = 2.30, HFOV = 37.5 deg.

| Surface # | | Curvature Radius | Thickness | Material | Index | Abbe # | Focal length |
|---|---|---|---|---|---|---|---|
| 13 | | Plano | 0.251 | | | | |
| 14 | Image | Plano | — | | | | |

Note:
Reference wavelength (d-line) is 587.6 nm.

TABLE 6

Aspheric Coefficients

| Surface # | | | | | |
|---|---|---|---|---|---|
| | 2 | 3 | 4 | 5 | 6 |
| k = | −1.85051E−01 | 6.37790E+00 | −3.54402E+01 | −1.59011E+01 | 3.00000E+00 |
| A4 = | −7.77504E−03 | −1.89367E−01 | −5.66709E−01 | −2.89351E−01 | −2.01380E−01 |
| A6 = | 9.95230E−02 | 7.60915E−02 | 5.97398E−01 | 3.37796E−01 | 2.42902E−02 |
| A8 = | −4.15913E−01 | −2.96614E−01 | −1.56376E+00 | −5.44509E−01 | 5.56528E−01 |
| A10 = | 7.55660E−01 | −3.97646E−01 | 1.05642E+00 | 1.40429E−01 | −3.23131E−01 |
| A12 = | −1.10184E+00 | 2.45857E−02 | −4.66058E−02 | −3.73841E−02 | −1.70491E+00 |
| A14 = | 8.55184E−02 | −1.22676E−01 | 7.84948E−02 | 1.52830E−02 | 2.94968E+00 |
| A16 = | | | | | −1.81800E+00 |

| Surface # | | | | | |
|---|---|---|---|---|---|
| | 7 | 8 | 9 | 10 | 11 |
| k = | 1.37470E+00 | −2.94475E+00 | −6.68855E−01 | −1.67852E+01 | −6.57120E+00 |
| A4 = | −1.28476E−02 | −2.78727E−02 | 3.71560E−01 | −2.33048E−01 | −8.99262E−02 |
| A6 = | −3.11547E−02 | −7.78204E−01 | −3.73546E−01 | 9.49787E−02 | 4.08789E−02 |
| A8 = | 1.03632E−01 | 1.45683E+00 | 1.26390E−01 | −4.97539E−02 | −1.90130E−02 |
| A10 = | 6.98422E−01 | −1.17693E+00 | 2.21642E−01 | 1.31271E−02 | 5.60792E−03 |
| A12 = | −5.05758E−01 | 1.70758E−01 | −1.15747E−01 | 5.80171E−03 | −9.91278E−04 |
| A14 = | −2.83938E−05 | 4.02431E−01 | −1.50455E−01 | −3.63110E−04 | 8.42196E−05 |
| A16 = | | −4.23905E−01 | 1.24269E−01 | −7.23386E−04 | |

In the image capturing optical lens system according to the 3rd embodiment, the definitions of f, Fno, HFOV, V2, V3, CT4, CT5, T23, T34, T45, SAG42, R3, R4, R5, R6, f1, f3, f4, f5, SD, TD, TTL and ImgH are the same as those stated in the 1st embodiment with corresponding values for the 3rd embodiment. Moreover, these parameters can be calculated from Table 5 and Table 6 as the following values and satisfy the following relationships:

| | | | |
|---|---|---|---|
| f (mm) | 2.88 | (R5 + R6)/(R5 − R6) | 0.83 |
| Fno | 2.30 | f/f3 | 1.16 |
| HFOV (deg.) | 37.5 | f/f3 − f/f1 | 0.32 |
| V3 − V2 | 32.6 | |f/f4| + |f/f5| | 0.76 |
| CT5/CT4 | 3.49 | (f1 − f3)/T45 | 21.20 |
| T23/T34 | 0.38 | SD/TD | 0.96 |
| (CT4 + SAG42) * 100/f | −8.84 | TTL/ImgH | 1.71 |
| (R3 − R4)/(R3 + R4) | 0.39 | | |

4th Embodiment

Figure 7:
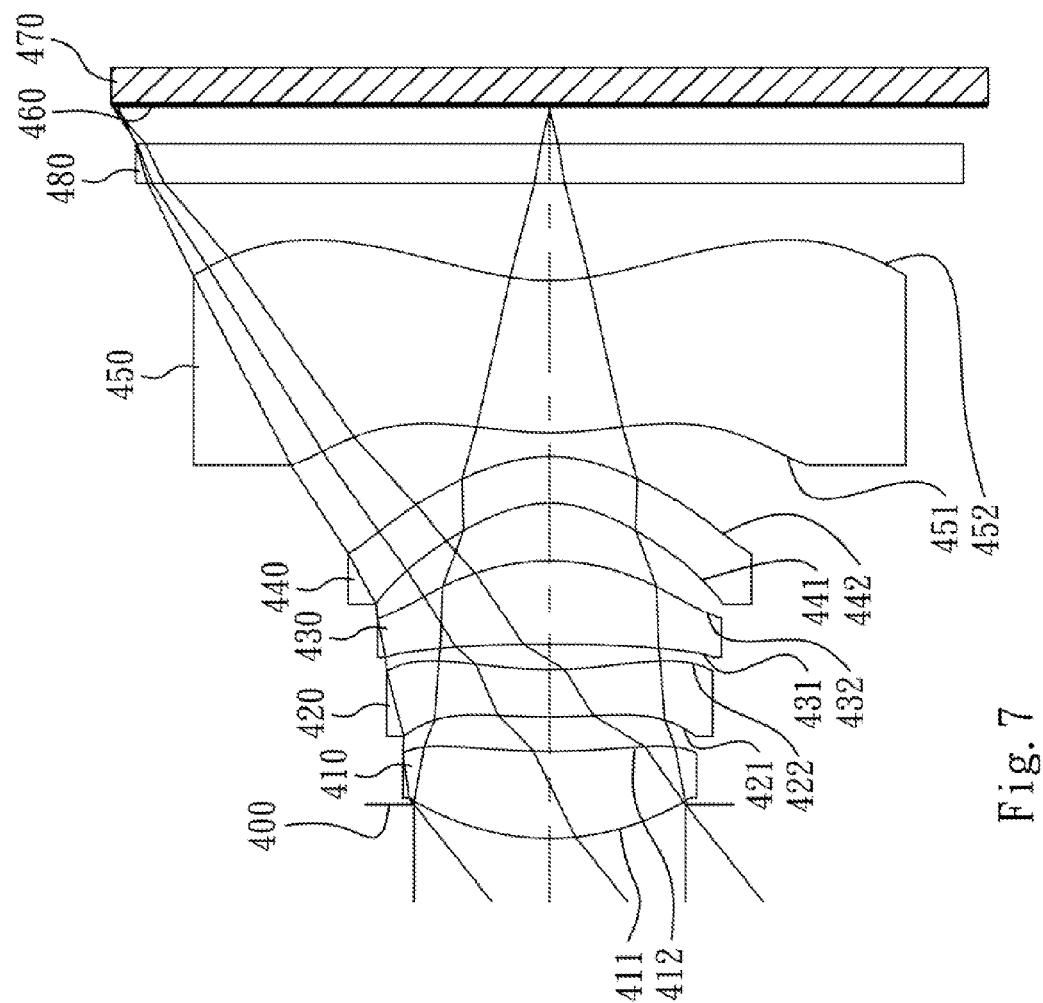
FIG. 7 is a schematic view of an image capturing optical lens system according to the 4th embodiment of the present disclosure.
Figure 8:
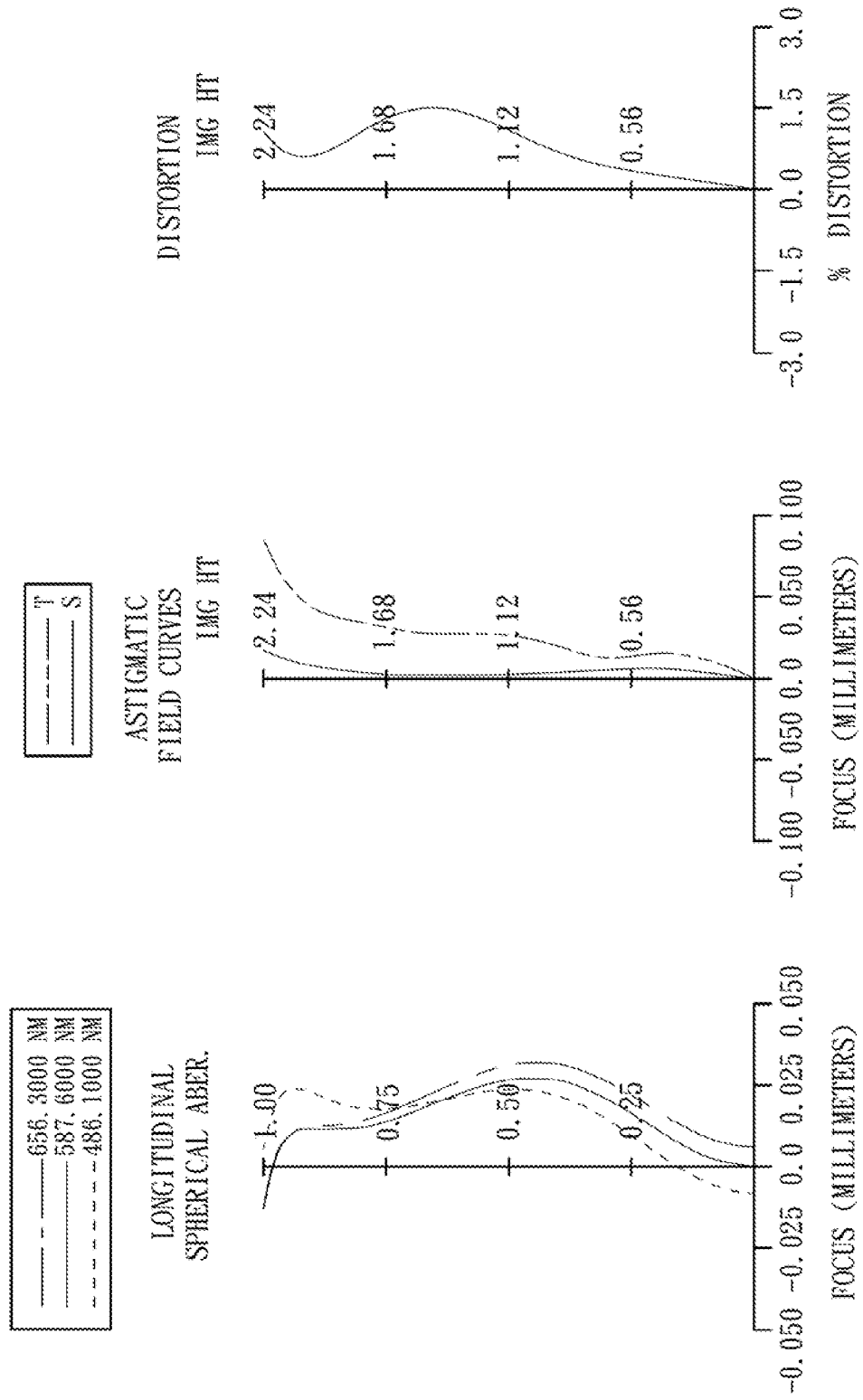
FIG. 8 shows spherical aberration curves, astigmatic field curves and a distortion curve of the image capturing optical lens system according to the 4th embodiment.

FIG. 7 is a schematic view of an image capturing optical lens system according to the 4th embodiment of the present disclosure. FIG. 8 shows spherical aberration curves, astigmatic field curves and a distortion curve of the image capturing optical lens system according to the 4th embodiment. In FIG. 7, the image capturing optical lens system includes, in order from an object side to an image side, an aperture stop 400, the first lens element 410, the second lens element 420, the third lens element 430, the fourth lens element 440, the fifth lens element 450, an IR-cut filter 480, an image plane 460 and an image sensor 470.

The first lens element 410 with positive refractive power has a convex object-side surface 411 and a concave image-side surface 412, and is made of plastic material. The object-side surface 411 and the mage-side surface 412 of the first lens element 410 are aspheric.

The second lens element 420 with negative refractive power has a convex object-side surface 421 and a concave image-side surface 422, and is made of plastic material. The object-side surface 421 and the image-side surface 422 of the second lens element 420 are aspheric.

The third lens element 430 with positive refractive power has a concave object-side surface 431 and a convex image-side surface 432, and is made of plastic material. The object-side surface 431 and the image-side surface 432 to of the third lens element 430 are aspheric.

The fourth lens element 440 with negative refractive power has a concave object-side surface 441 and a convex image-side surface 442, and is made of plastic material. The object-side surface 441 and the image-side surface 442 of the fourth lens element 440 are aspheric.

The fifth lens element 450 with negative refractive power has a convex object-side surface 451 and a concave image-side surface 452, and is made of plastic material. The object-side surface 451 and the image-side surface 452 of the fifth lens element 450 are aspheric. Furthermore, the fifth lens element 450 has inflection points formed on the object-side surface 451 and the image-side surface 452 thereof.

The IR-cut filter 480 is made of glass, and located between the fifth lens element 450 and the image plane 460, and will not affect the focal length of the image capturing optical lens system.

The detailed optical data of the 4th embodiment are shown in Table 7 and the aspheric surface data are shown in Table 8 below.

| f (mm) | 2.77 | (R5 + R6)/(R5 − R6) | 1.13 |
|---|---|---|---|
| Fno | 2.00 | f/f3 | 1.17 |
| HFOV (deg.) | 38.5 | f/f3 − f/f1 | 0.41 |
| V3 − V2 | 34.5 | |f/f4| + |f/f5| | 0.67 |
| CT5/CT4 | 3.24 | (f1 − f3)/T45 | 10.72 |

TABLE 7

4th Embodiment
f = 2.77 mm, Fno = 2.00, HFOV = 38.5 deg.

| Surface # | | Curvature Radius | Thickness | Material | Index | Abbe # | Focal length |
|---|---|---|---|---|---|---|---|
| 0 | Object | Plano | Infinity | | | | |
| 1 | Ape. Stop | Plano | −0.173 | | | | |
| 2 | Lens 1 | 1.335780 (ASP) | 0.443 | Plastic | 1.544 | 55.9 | 3.66 |
| 3 | | 3.577500 (ASP) | 0.178 | | | | |
| 4 | Lens 2 | 3.351300 (ASP) | 0.240 | Plastic | 1.650 | 21.4 | −8.18 |
| 5 | | 1.997030 (ASP) | 0.128 | | | | |
| 6 | Lens 3 | −19.379800 (ASP) | 0.427 | Plastic | 1.544 | 55.9 | 2.38 |
| 7 | | −1.221690 (ASP) | 0.296 | | | | |
| 8 | Lens 4 | −0.582160 (ASP) | 0.240 | Plastic | 1.650 | 21.4 | −6.05 |
| 9 | | −0.794220 (ASP) | 0.120 | | | | |
| 10 | Lens 5 | 1.723770 (ASP) | 0.778 | Plastic | 1.544 | 55.9 | −12.80 |
| 11 | | 1.162040 (ASP) | 0.500 | | | | |
| 12 | IR-cut filter | Plano | 0.200 | Glass | 1.517 | 64.2 | — |
| 13 | | Plano | 0.200 | | | | |
| 14 | Image | Plano | — | | | | |

Note:
Reference wavelength (d-line) is 587.6 nm.

TABLE 8

Aspheric Coefficients

| | Surface # | | | | |
|---|---|---|---|---|---|
| | 2 | 3 | 4 | 5 | 6 |
| k = | −1.44376E−01 | 5.91588E+00 | −4.77168E+00 | −7.61112E+00 | −1.00000E+00 |
| A4 = | −7.51255E−03 | −1.83070E−01 | −5.60681E−01 | −3.22446E−01 | −1.60129E−01 |
| A6 = | 1.25625E−01 | 5.22366E−03 | 4.04828E−01 | 2.75940E−01 | −1.33515E−02 |
| A8 = | −4.63802E−01 | −1.25585E−01 | −1.53669E+00 | −4.45660E−01 | 5.97104E−01 |
| A10 = | 9.75174E−01 | −4.22194E−01 | 1.26396E+00 | 1.24513E−01 | −2.72228E−01 |
| A12 = | −1.10184E+00 | 2.45857E−02 | −4.66058E−02 | −3.73841E−02 | −1.70491E+00 |
| A14 = | 8.55184E−02 | −1.22676E−01 | 7.84948E−02 | 1.52830E−02 | 2.94968E+00 |
| A16 = | | | | | −1.81800E+00 |

| | Surface # | | | | |
|---|---|---|---|---|---|
| | 7 | 8 | 9 | 10 | 11 |
| k = | 5.62445E−01 | −2.55532E+00 | −7.19354E−01 | −2.05612E+01 | −7.08121E+00 |
| A4 = | 3.71743E−02 | 7.31245E−02 | 4.13822E−01 | −2.43761E−01 | −9.29460E−02 |
| A6 = | −5.65742E−02 | −7.43673E−01 | −3.61690E−01 | 9.78274E−02 | 4.16771E−01 |
| A8 = | 1.35128E−01 | 1.40888E+00 | 1.10034E−01 | −4.83650E−02 | −1.94221E−02 |
| A10 = | 7.75780E−01 | −1.23170E+00 | 2.14659E−01 | 1.24880E−02 | 5.59743E−03 |
| A12 = | −5.24138E−01 | 2.11793E−01 | −1.13449E−01 | 5.67496E−03 | −1.03565E−03 |
| A14 = | −2.83862E−05 | 4.02431E−01 | −1.43991E−01 | −4.56969E−04 | 9.88464E−05 |
| A16 = | | −4.23905E−01 | 1.21197E−01 | −6.50514E−04 | |

In the image capturing optical lens system according to the 4th embodiment, the definitions of f, Fno, HFOV, V2, V3, CT4, CT5, T23, T34, T45, SAG42, R3, R4, R5, R6, f1, f3, f4, f5, SD, TD, TTL and ImgH are the same as those stated in the 1st embodiment with corresponding values for the 4th embodiment. Moreover, these parameters can be calculated from Table 7 and Table 8 as the following values and satisfy the following relationships:

| T23/T34 | 0.43 | SD/TD | 0.94 |
|---|---|---|---|
| (CT4 + SAG42) * 100/f | −9.27 | TTL/ImgH | 1.64 |
| (R3 − R4)/(R3 + R4) | 0.25 | | |

5th Embodiment

Figure 9:
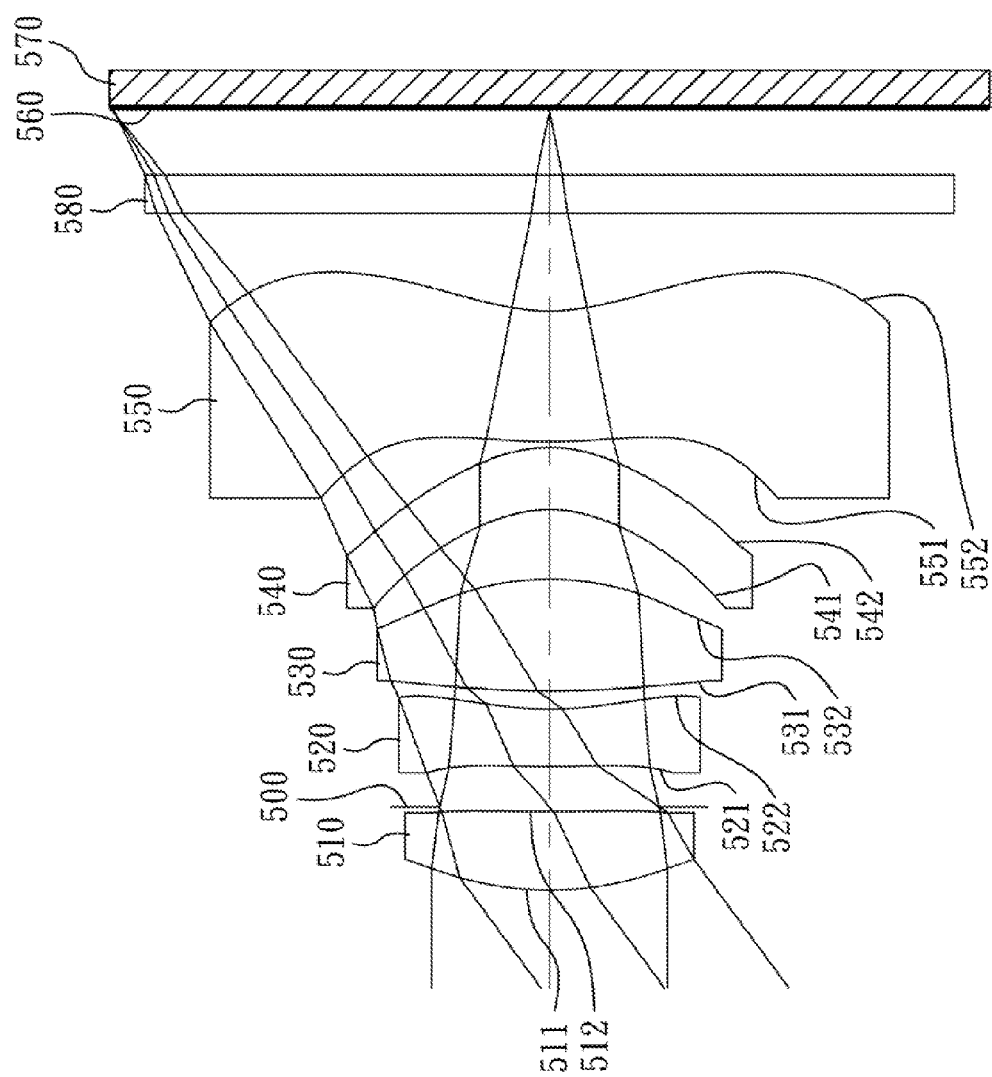
FIG. 9 is a schematic view of an image capturing optical lens system according to the 5th embodiment of the present disclosure.
Figure 10:
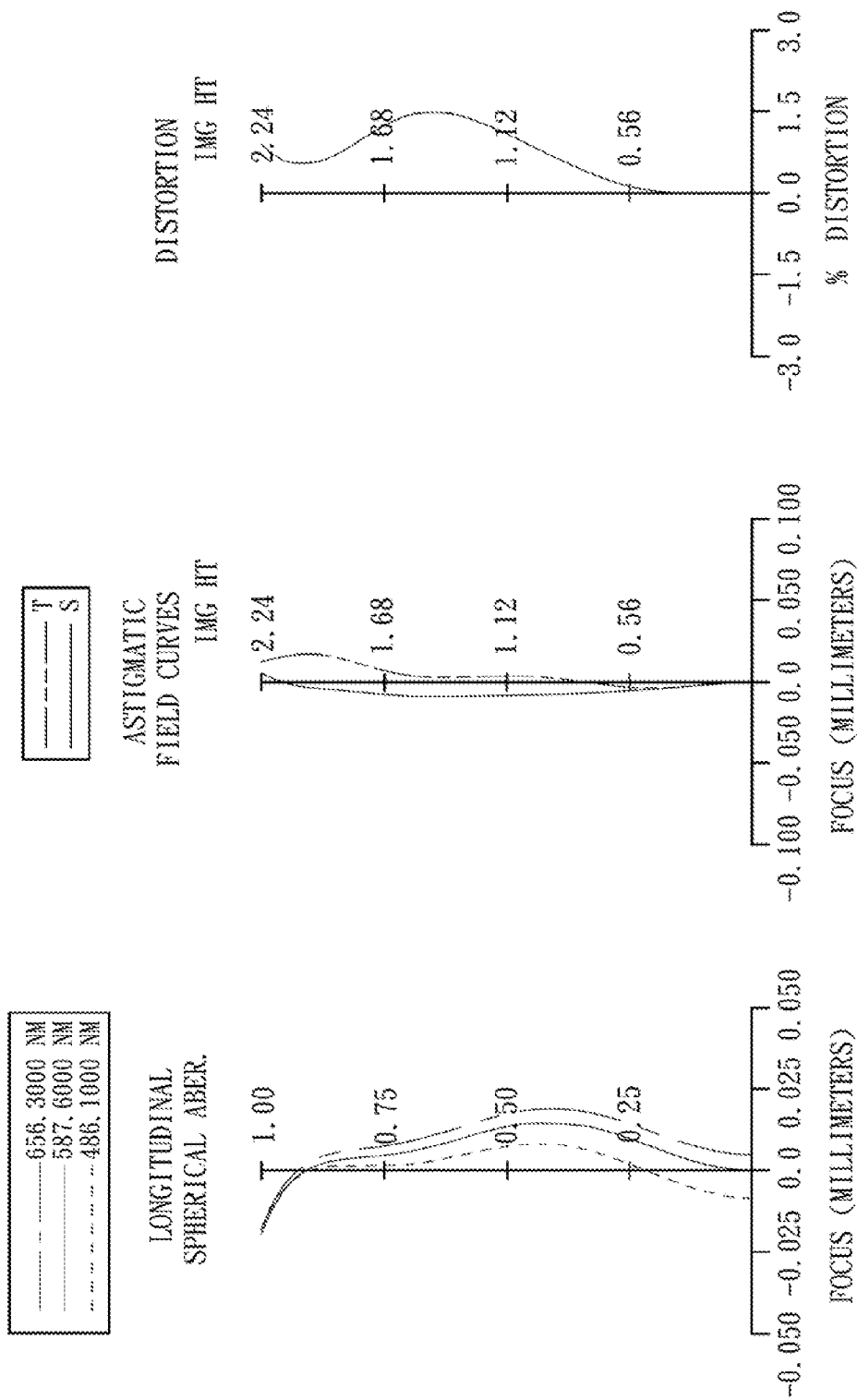
FIG. 10 shows spherical aberration curves, astigmatic field curves and a distortion curve of the image capturing optical lens system according to the 5th embodiment.

FIG. 9 is a schematic view of an image capturing optical lens system according to the 5th embodiment of the present disclosure. FIG. 10 shows spherical aberration curves, astigmatic field curves and a distortion curve of the image capturing optical lens system according to the 5th embodiment. In FIG. 9, the image capturing optical lens system includes, in order from an object side to an image side, the first lens element 510, an aperture stop 500, the second lens element 520, the third lens element 530, the fourth lens element 540, the fifth lens element 550, an IR-cut filter 580, an image plane 560 and an image sensor 570.

The first lens element 510 with positive refractive power has a convex object-side surface 511 and a concave image-side surface 512, and is made of plastic material. The object-side surface 511 and the image-side surface 512 of the first lens element 510 are aspheric.

The second lens element 520 with negative refractive power has a convex object-side surface 521 and a concave image-side surface 522, and is made of plastic material, The object-side surface 521 and the image-side surface 522 of the second lens element 520 are aspheric.

The third lens element 530 with positive refractive power has a convex object-side surface 531 and a convex image-side surface 532, and is made of plastic material. The object-side surface 531 and the image-side surface 532 of the third lens element 530 are aspheric.

The fourth lens element 540 with positive refractive power has a concave object-side surface 541 and a convex image-side surface 542, and is made of plastic material. The object-side surface 541 and the image-side surface 542 of the fourth lens element 540 are aspheric.

The fifth lens element 550 with negative refractive power has a convex object-side surface 551 and a concave image-side surface 552, and is made of plastic material. The object-side surface 551 and the image-side surface 552 of the fifth lens element 550 are aspheric. Furthermore, the fifth lens element 550 has inflection points formed on the object-side surface 551 and the image-side surface 552 thereof.

The IR-cut filter 580 is made of glass, and located between the fifth lens element 550 and the image plane 560, and will not affect the focal length of the image capturing optical lens system.

The detailed optical data of the 5th embodiment are shown in Table 9 and the aspheric surface data are shown in Table 10 below.

TABLE 9

5th Embodiment
f = 3.01 mm, Fno = 2.50, HFOV = 36.4 deg.

| Surface # | | Curvature Radius | Thickness | Material | Index | Abbe # | Focal length |
|---|---|---|---|---|---|---|---|
| 0 | Object | Plano | Infinity | | | | |
| 1 | Lens 1 | 1.644430 (ASP) | 0.404 | Plastic | 1.544 | 55.9 | 3.41 |
| 2 | | 13.120400 (ASP) | 0.024 | | | | |
| 3 | Ape. Stop | Plano | 0.204 | | | | |
| 4 | Lens 2 | 5.535000 (ASP) | 0.296 | Plastic | 1.634 | 23.8 | −3.75 |
| 5 | | 1.628810 (ASP) | 0.093 | | | | |
| 6 | Lens 3 | 4.698400 (ASP) | 0.571 | Plastic | 1.544 | 55.9 | 2.16 |
| 7 | | −1.503330 (ASP) | 0.354 | | | | |
| 8 | Lens 4 | −0.692880 (ASP) | 0.317 | Plastic | 1.583 | 30.2 | 14.05 |
| 9 | | −0.746570 (ASP) | 0.030 | | | | |
| 10 | Lens 5 | 2.723910 (ASP) | 0.668 | Plastic | 1.535 | 56.3 | −3.26 |
| 11 | | 0.971910 (ASP) | 0.500 | | | | |
| 12 | IR-cut filter | Plano | 0.200 | Glass | 1.517 | 64.2 | — |
| 13 | | Plano | 0.342 | | | | |
| 14 | Image | Plano | — | | | | |

Note:
Reference wavelength (d-line) is 587.6 nm.

TABLE 10

Aspheric Coefficients

| Surface # | | | | | |
|---|---|---|---|---|---|
| | 1 | 2 | 4 | 5 | 6 |
| k = | −6.53179E−01 | −1.00000E+00 | −6.56052E+00 | −1.06334E+01 | 3.00000E+00 |
| A4 = | −1.78939E−02 | −1.30082E−01 | −5.14353E−01 | −2.48468E−01 | −1.70239E−01 |
| A6 = | 1.80327E−01 | 3.93518E−02 | 5.92991E−01 | 3.37723E−01 | 1.31243E−01 |
| A8 = | −8.62223E−01 | −2.17746E−01 | −1.54483E+00 | −4.22465E−01 | 5.44505E−01 |
| A10 = | 1.73901E+00 | 4.34472E−01 | 1.91358E+00 | −3.90190E−02 | −5.48840E−01 |
| A12 = | −1.68947E+00 | −1.06898E+00 | −1.21658E+00 | −5.20678E−04 | −1.51302E+00 |
| A14 = | 8.21145E−02 | −1.29541E−01 | 7.48571E−02 | 5.49388E−02 | 2.97235E+00 |
| A16 = | | | | | −1.60448E+00 |

| Surface # | | | | | |
|---|---|---|---|---|---|
| | 7 | 8 | 9 | 10 | 11 |
| k = | 1.42357E+00 | −1.92755E+00 | −7.28079E−01 | −3.00000E+01 | −6.93689E+00 |
| A4 = | −2.18114E−02 | 1.60959E−01 | 4.71774E−01 | −2.55979E−01 | −1.17650E−01 |
| A6 = | 6.15018E−02 | −8.50533E−01 | −4.20002E−01 | 5.36606E−02 | 5.36309E−02 |
| A8 = | 5.89830E−02 | 1.40544E+00 | 1.34882E−01 | −3.94013E−02 | −2.53910E−02 |
| A10 = | 6.02992E−01 | −1.07686E+00 | 2.06944E−01 | 5.81383E−03 | 6.67641E−03 |
| A12 = | −4.78116E−01 | 1.07551E−01 | −1.19327E−01 | −2.73750E−03 | −1.01385E−03 |

TABLE 10-continued

| Aspheric Coefficients | | | | | |
|---|---|---|---|---|---|
| A14 = | 5.13445E−02 | 3.70607E−01 | −1.32807E−01 | −1.67054E−03 | 7.49944E−05 |
| A16 = | | −2.85150E−01 | 1.14029E−01 | 4.46742E−03 | |

In the image capturing optical lens system according to the 5th embodiment, the definitions of f, Fno, HFOV, V2, V3, CT4, CT5, T23, T34, T45, SAG42, R3, R4, R5, R6, f1, f3, f4, f5, SD, TD, TTL and ImgH are the same as those stated in the 1st embodiment with corresponding values for the 5th embodiment. Moreover, these parameters can be calculated from Table 9 and Table 10 as the following values and satisfy the following relationships:

| | | | |
|---|---|---|---|
| f (mm) | 3.01 | (R5 + R6)/(R5 − R6) | 0.52 |
| Fno | 2.50 | f/f3 | 1.39 |
| HFOV (deg.) | 36.4 | f/f3 − f/f1 | 0.51 |
| V3 − V2 | 32.1 | \|f/f4\| + \|f/f5\| | 1.14 |
| CT5/CT4 | 2.11 | (f1 − f3)/T45 | 41.65 |
| T23/T34 | 0.26 | SD/TD | 0.86 |
| (CT4 + SAG42) * 100/f | −7.81 | TTL/ImgH | 1.76 |
| (R3 − R4)/(R3 + R4) | 0.55 | | |

6th Embodiment

Figure 11:
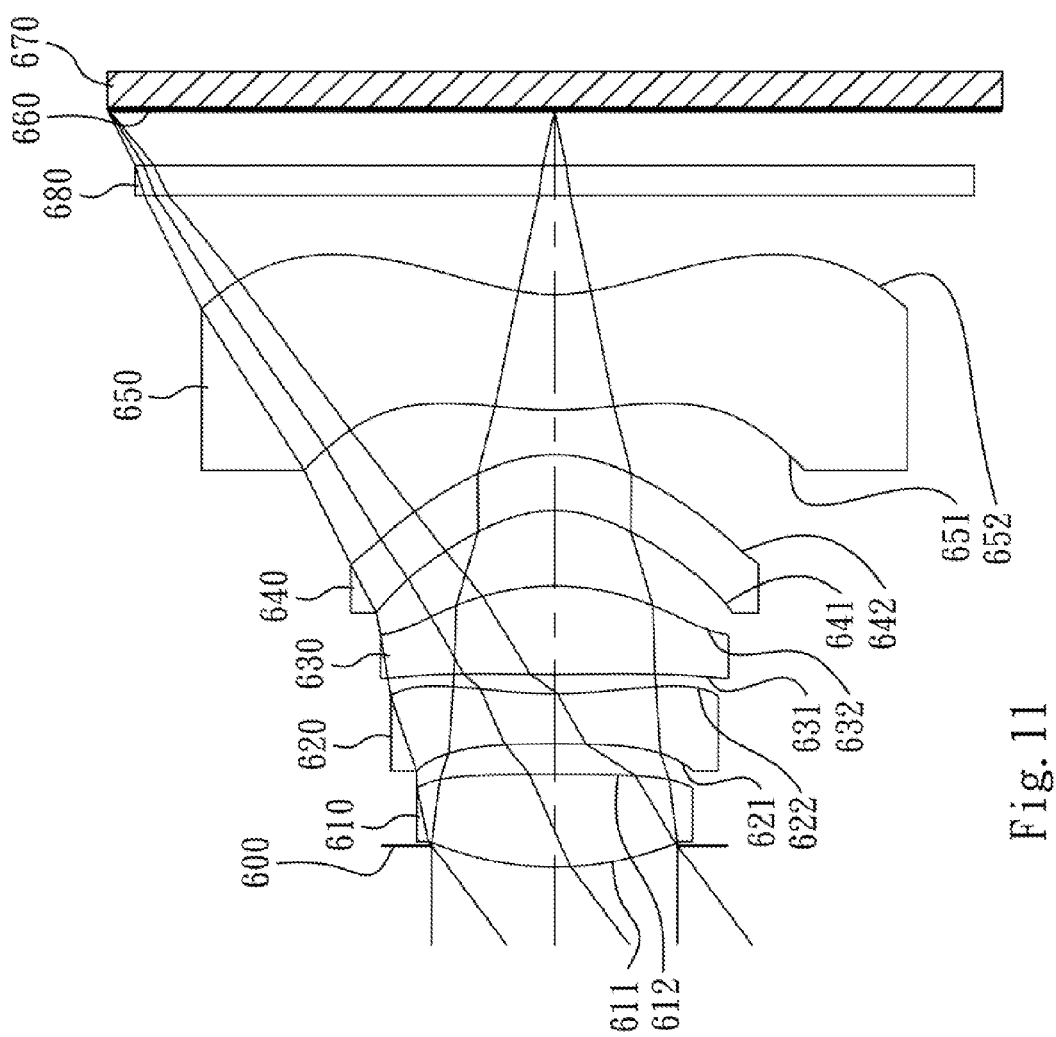
FIG. 11 is a schematic view of an image capturing optical lens system according to the 6th embodiment of the present disclosure.
Figure 12:
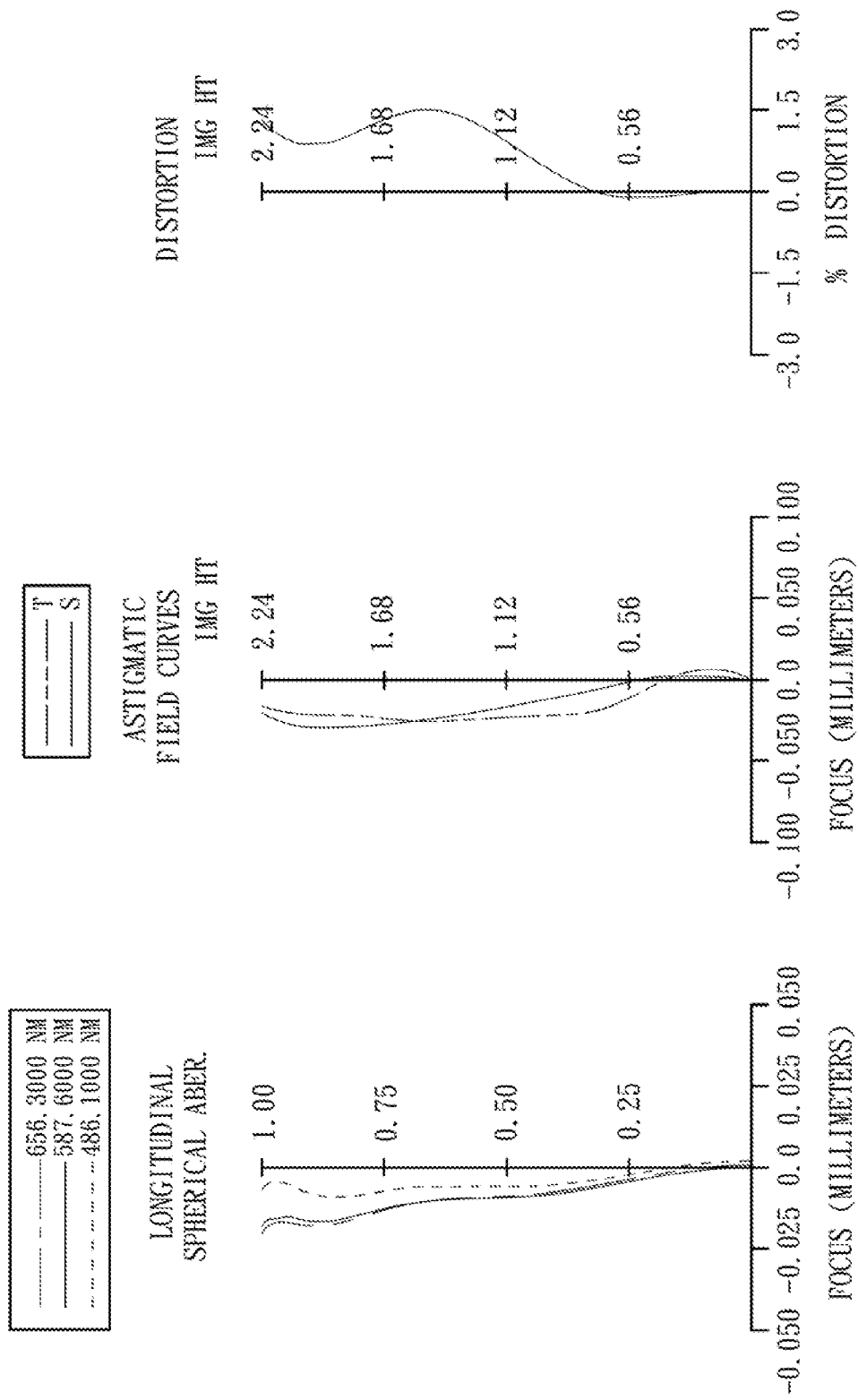
FIG. 12 shows spherical aberration curves, astigmatic field curves and a distortion curve of the image capturing optical lens system according to the 6th embodiment.

FIG. 11 is a schematic view of an image capturing optical lens system according to the 6th embodiment of the present disclosure. FIG. 12 shows spherical aberration curves, astigmatic field curves and a distortion curve of the image capturing optical lens system according to the 6th embodiment. In FIG. 11, the image capturing optical lens system includes, in order from an object side to an image side, an aperture stop 600, the first lens element 610, the second lens element 620 the third lens element 630, the fourth lens element 640, the fifth lens element 650, an IR-cut filter 680, an image plane 660 and an image sensor 670.

The first lens element 610 with positive refractive power has a convex object-side surface 611 and a convex image-side surface 612, and is made of plastic material. The object-side surface 611 and the image-side surface 612 of the first lens element 610 are aspheric.

The second lens element 620 with negative refractive power has a concave object-side surface 621 and a concave image-side surface 622, and is made of plastic material. The object-side surface 621 and the image-side surface 622 of the second lens element 620 are aspheric.

The third lens element 630 with positive refractive power has a convex object-side surface 631 and a convex image-side surface 632, and is made of plastic material. The object-side surface 631 and the image-side surface 632 of the third lens element 630 are aspheric.

The fourth lens element 640 with negative refractive power has a concave object-side surface 641 and a convex image-side surface 642, and is made of plastic material. The object-side surface 641 and the image-side surface 642 of the fourth lens element 640 are aspheric.

The fifth lens element 650 with negative refractive power has a convex object-side surface 651 and a concave image-side surface 652, and is made of plastic material. The object-side surface 651 and the image-side surface 652 of the fifth lens element 650 are aspheric. Furthermore, the fifth lens element 650 has inflection points formed on the object-side surface 651 and the image-side surface 652 thereof.

The IR-cut filter 680 is made of glass, and located between the fifth lens element 650 and the image plane 660, and will not affect the focal length of the image capturing optical lens system.

The detailed optical data of the 6th embodiment are shown in Table 11 and the aspheric surface data are shown in Table 12 below.

TABLE 11

6th Embodiment
f = 2.96 mm, Fno = 2.40, HFOV = 36.9 deg.

| Surface # | | Curvature Radius | Thickness | Material | Index | Abbe # | Focal length |
|---|---|---|---|---|---|---|---|
| 0 | Object | Plano | Infinity | | | | |
| 1 | Ape. Stop | Plano | −0.110 | | | | |
| 2 | Lens 1 | 1.529020 (ASP) | 0.465 | Plastic | 1.544 | 55.9 | 2.68 |
| 3 | | −28.571400 (ASP) | 0.154 | | | | |
| 4 | Lens 2 | −10.235500 (ASP) | 0.250 | Plastic | 1.640 | 23.3 | −2.65 |
| 5 | | 2.052750 (ASP) | 0.097 | | | | |
| 6 | Lens 3 | 7.309700 (ASP) | 0.447 | Plastic | 1.544 | 55.9 | 2.03 |
| 7 | | −1.270070 (ASP) | 0.377 | | | | |
| 8 | Lens 4 | −0.616650 (ASP) | 0.280 | Plastic | 1.535 | 56.3 | −35.28 |
| 9 | | −0.738330 (ASP) | 0.225 | | | | |
| 10 | Lens 5 | 1.918800 (ASP) | 0.579 | Plastic | 1.535 | 56.3 | −4.15 |
| 11 | | 0.921210 (ASP) | 0.500 | | | | |
| 12 | IR-cut filter | Plano | 0.150 | Glass | 1.517 | 64.2 | — |
| 13 | | Plano | 0.280 | | | | |
| 14 | Image | Plano | — | | | | |

Note:
Reference wavelength (d-line) is 587.6 nm.

TABLE 12

Aspheric Coefficients

| Surface # | | | | |
|---|---|---|---|---|
| 2 | 3 | 4 | 5 | 6 |
| k = −2.42175E−01 | −2.99984E+01 | −1.00000E+00 | −2.76771E+01 | −3.00000E+01 |
| A4 = −2.09392E−03 | −1.38455E−01 | −5.39510E−01 | −2.50311E−01 | −2.68877E−01 |
| A6 = 3.20986E−02 | 3.05190E−02 | 7.68908E−01 | 3.97501E−01 | 6.58077E−02 |
| A8 = −3.45059E−01 | −4.06044E−01 | −1.47802E+00 | −5.64359E−01 | 6.16206E−01 |
| A10 = 9.97665E−01 | 5.86797E−02 | 6.79556E−01 | −2.20395E−02 | −3.22952E−01 |
| A12 = −1.85942E+00 | −1.08277E+00 | −1.09508E+00 | −3.84019E−04 | −1.69352E+00 |
| A14 = 8.04918E−02 | −1.27404E−01 | 7.70591E−02 | 4.63797E−02 | 2.96602E+00 |
| A16 = | | | | −1.60161E+00 |

| Surface # | | | | |
|---|---|---|---|---|
| 7 | 8 | 9 | 10 | 11 |
| k = 7.41673E−01 | −2.25439E+00 | −7.30217E−01 | −2.86670E+01 | −7.22964E+00 |
| A4 = 7.80998E−02 | 1.02221E−01 | 4.38051E−01 | −2.68267E−01 | −1.15315E−01 |
| A6 = −3.38031E−02 | −7.43036E−01 | −3.80411E−01 | 8.56600E−02 | 4.98727E−02 |
| A8 = 1.21518E−01 | 1.38930E+00 | 1.21996E−01 | −5.20278E−02 | −2.27633E−02 |
| A10 = 7.26900E−01 | −1.19669E+00 | 2.18470E−01 | 1.19296E−02 | 5.86166E−03 |
| A12 = −4.88386E−01 | 1.77515E−01 | −1.20137E−01 | 4.99653E−03 | −8.49509E−04 |
| A14 = 8.35793E−02 | 4.12882E−01 | −1.50584E−01 | −6.10007E−04 | 5.92286E−05 |
| A16 = | −3.62974E−01 | 1.30669E−01 | −1.41015E−04 | |

In the image capturing optical lens system according to the 6th embodiment, the definitions of f, Fno, HFOV, V2, V3, CT4, CT5, T23, T34, T45, SAG42, R3, R4, R5, R6, f1, f3, f4, f5, SD, TD, TTL and ImgH are the same as those stated in the 1st embodiment with corresponding values for the 6th embodiment. Moreover, these parameters can be calculated from Table 11 and Table 12 as the following values and satisfy the following relationships:

| | | | |
|---|---|---|---|
| f (mm) | 2.96 | (R5 + R6)/(R5 − R6) | 0.70 |
| Fno | 2.40 | f/f3 | 1.46 |
| HFOV (deg.) | 36.9 | f/f3 − f/f1 | 0.36 |
| V3 − V2 | 32.6 | \|f/f4\| + \|f/f5\| | 0.80 |
| CT5/CT4 | 2.07 | (f1 − f3)/T45 | 2.92 |
| T23/T34 | 0.26 | SD/TD | 0.96 |
| (CT4 + SAG42) * 100/f | −9.10 | TTL/ImgH | 1.68 |
| (R3 − R4)/(R3 + R4) | 1.50 | | |

7th Embodiment

Figure 13:
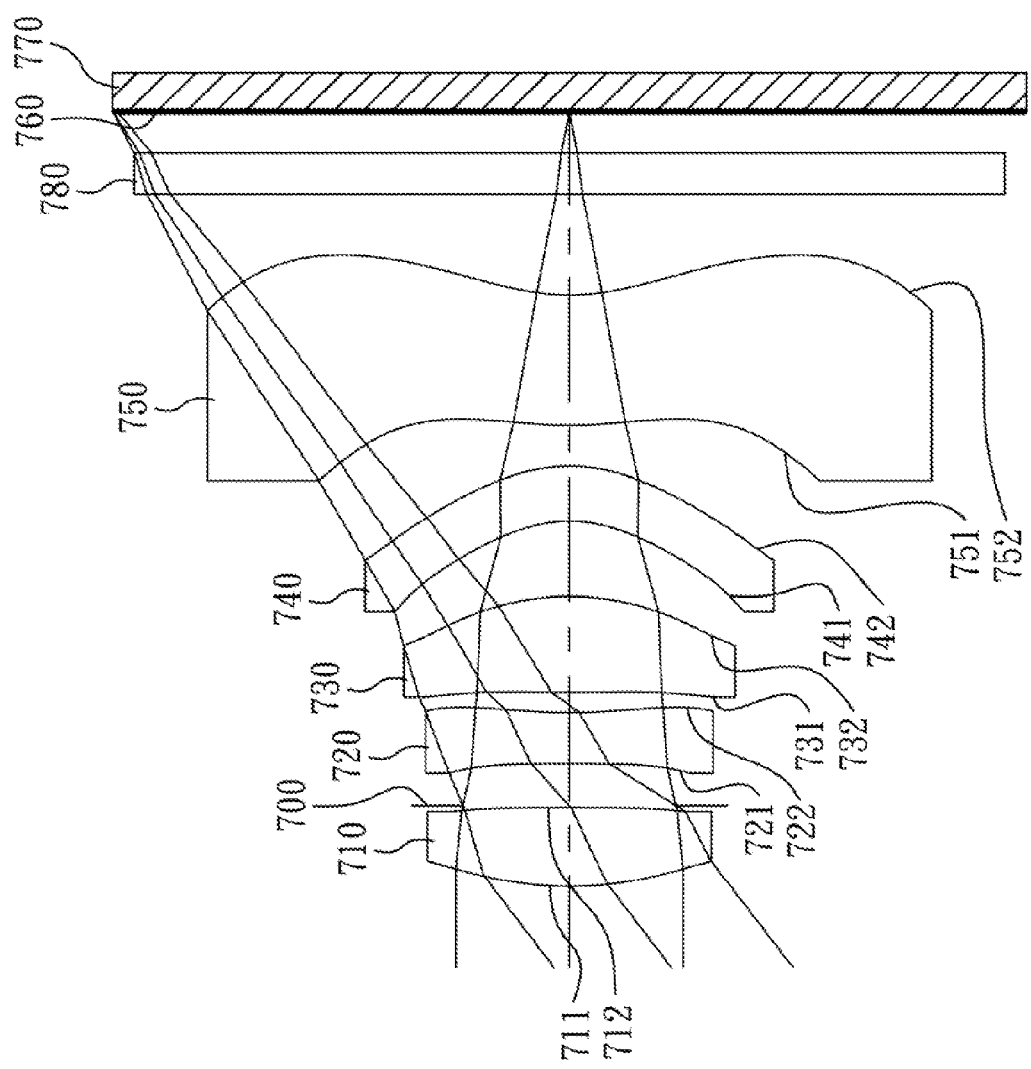
FIG. 13 is a schematic view of an image capturing optical lens system according to the 7th embodiment of the present disclosure.
Figure 14:
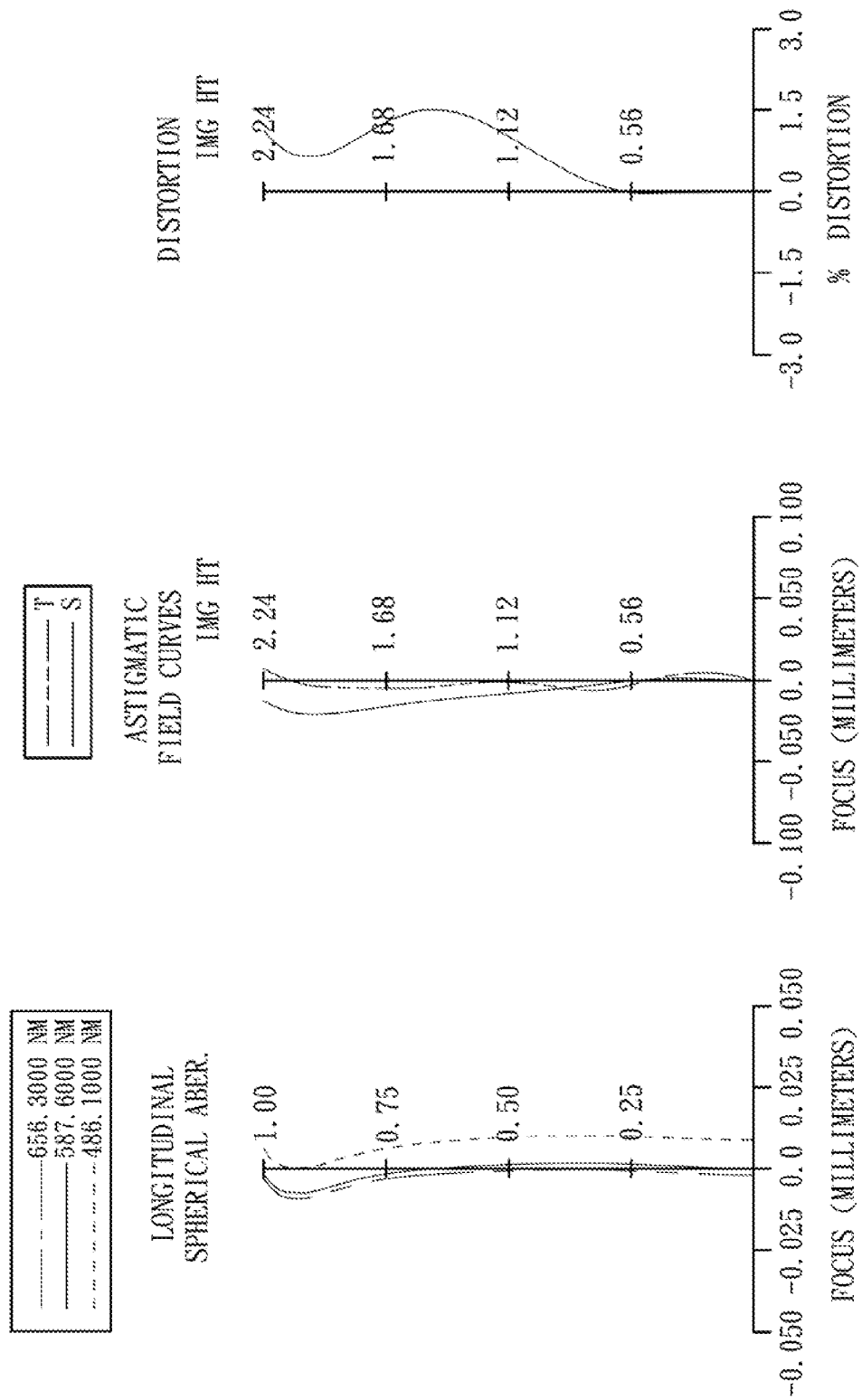
FIG. 14 shows spherical aberration curves, astigmatic field curves and a distortion curve of the image capturing optical lens system according to the 7th embodiment.

FIG. 13 is a schematic view of an image capturing optical lens system according to the 7th embodiment of the present disclosure. FIG. 14 shows spherical aberration curves, astigmatic field curves and a distortion curve of the image capturing optical lens system according to the 7th embodiment. In FIG. 13, the image capturing optical lens system includes, in order from an object side to an image side, the first lens element 710, an aperture stop 700, the second lens element 720, the third lens element 730, the fourth lens element 740, the fifth lens element 750, an IR-cut filter 780, an image plane 760 and an image sensor 770.

The first lens element 710 with positive refractive power has a convex object-side surface 711 and a convex image-side surface 712, and is made of glass. The object-side surface 711 and the image-side surface 712 of the first lens element 710 are aspheric.

The second lens element 720 with negative refractive power has a concave object-side surface 721 and a concave image-side surface 722, and is made of plastic material. The object-side surface 721 and the image-side surface 722 of the second lens element 720 are aspheric.

The third lens element 730 with positive refractive power has a convex object-side surface 731 and a convex image-side surface 732, and is made of plastic material. The object-side surface 731 and the image-side surface 732 of the third lens element 730 are aspheric.

The fourth lens element 740 with negative refractive power has a concave object-side surface 741 and a convex image-side surface 742, and is made of plastic material. The object-side surface 741 and the image-side surface 742 of the fourth lens element 740 are aspheric.

The fifth lens element 750 with negative refractive power has a convex object-side surface 751 and a concave image-side surface 752, and is made of plastic material. The object-side surface 751 and the image-side surface 752 of the fifth lens element 750 are aspheric. Furthermore, the fifth lens element 750 has inflection points formed on the object-side surface 751 and the image-side surface 752 thereof.

The IR-cut filter 750 is made of glass, and located between the fifth lens element 750 and the image plane 760, and will not affect the focal length of the image capturing optical lens system.

The detailed optical data of the 7th embodiment are shown in Table 13 and the aspheric surface data are shown in Table 14 below.

TABLE 13

7th Embodiment
f = 2.90 mm, Fno = 2.60, HFOV = 37.4 deg.

| Surface # | | Curvature Radius | Thickness | Material | Index | Abbe # | Focal length |
|---|---|---|---|---|---|---|---|
| 0 | Object | Plano | Infinity | | | | |
| 1 | Lens 1 | 1.742360 (ASP) | 0.386 | Glass | 1.569 | 71.3 | 2.85 |
| 2 | | −21.276600 (ASP) | 0.009 | | | | |
| 3 | Abe. Stop | Plano | 0.207 | | | | |
| 4 | Lens 2 | −19.230800 (ASP) | 0.250 | Plastic | 1.640 | 23.3 | −3.47 |
| 5 | | 2.519300 (ASP) | 0.098 | | | | |
| 6 | Lens 3 | 9.659600 (ASP) | 0.473 | Plastic | 1.544 | 55.9 | 2.16 |
| 7 | | −1.311840 (ASP) | 0.369 | | | | |
| 8 | Lens 4 | −0.652050 (ASP) | 0.270 | Plastic | 1.640 | 23.3 | −17.23 |
| 9 | | −0.805010 (ASP) | 0.201 | | | | |
| 10 | Lens 5 | 2.082890 (ASP) | 0.637 | Plastic | 1.535 | 56.3 | −4.31 |
| 11 | | 0.977060 (ASP) | 0.500 | | | | |
| 12 | IR-cut filter | Plano | 0.200 | Glass | 1.517 | 64.2 | — |
| 13 | | Plano | 0.202 | | | | |
| 14 | Image | Plano | — | | | | |

Note:
Reference wavelength (d-line) is 587.6 nm.

TABLE 14

Aspheric Coefficients

| | Surface # | | | | |
|---|---|---|---|---|---|
| | 1 | 2 | 4 | 5 | 6 |
| k = | −8.04838E−01 | −2.60000E+01 | −1.00000E+00 | −3.00000E+01 | −3.00000E+01 |
| A4 = | −2.15674E−02 | −9.90550E−02 | −3.82036E−01 | −2.89257E−01 | −3.03120E−01 |
| A6 = | 4.32428E−02 | 7.13636E−02 | 6.74312E−01 | 3.70833E−01 | 4.70795E−02 |
| A8 = | −4.41256E−01 | −3.81490E−01 | −1.79733E+00 | −6.35630E−01 | 6.20969E−01 |
| A10 = | 9.73009E−01 | 6.09876E−02 | 1.23060E+00 | −1.65357E−01 | −2.57158E−01 |
| A12 = | −1.62197E+00 | −2.06564E+00 | 2.11848E−01 | −6.36863E−03 | −1.60116E+00 |
| A14 = | 4.71925E−01 | 4.99540E+00 | −1.18940E+00 | 8.98268E−01 | 3.08438E+00 |
| A16 = | | | | | −1.47116E+00 |

| | Surface # | | | | |
|---|---|---|---|---|---|
| | 7 | 8 | 9 | 10 | 11 |
| k = | 8.28413E−01 | −2.47905E+00 | −7.21723E−01 | −2.99690E+01 | −7.15911E+00 |
| A4 = | 5.58115E−02 | 1.32276E−01 | 4.33944E−01 | −2.80575E−01 | −1.13394E−01 |
| A6 = | −4.13017E−02 | −7.62146E−01 | −3.83703E−01 | 8.71978E−02 | 4.94929E−02 |
| A8 = | 1.18693E−01 | 1.35745E+00 | 1.23731E−01 | −4.74453E−02 | −2.22615E−02 |
| A10 = | 6.92960E−01 | −1.20096E+00 | 2.17578E−01 | 1.35489E−02 | 5.75690E−03 |
| A12 = | −5.14586E−01 | 2.05961E−01 | −1.15484E−01 | 5.19158E−03 | −9.08236E−04 |
| A14 = | 6.36891E−02 | 4.09716E−01 | −1.54439E−01 | −8.87857E−04 | 7.23691E−05 |
| A16 = | | −4.66848E−01 | 1.24575E−01 | −1.58957E−04 | |

In the image capturing optical lens system according to the 7th embodiment, the definitions of f, Fno, HFOV, V2, V3, CT4, CT5, T23, T34, T45, SAG42, R3, R4, R5, R6, f1, f3, f4, f5, SD, TD, TTL and ImgH are the same as those stated in the 1st embodiment with corresponding values for the 7th embodiment. Moreover, these parameters can be calculated from Table 13 and Table 14 as the following values and satisfy the following relationships:

| | | | |
|---|---|---|---|
| f (mm) | 2.90 | (R5 + R6)/(R5 − R6) | 0.76 |
| Fno | 2.60 | f/f3 | 1.34 |
| HFOV (deg.) | 37.4 | f/f3 − f/f1 | 0.33 |
| V3 − V2 | 32.6 | \|f/f4\| + \|f/f5\| | 0.84 |
| CT5/CT4 | 2.36 | (f1 − f3)/T45 | 3.44 |
| T23/T34 | 0.27 | SD/TD | 0.86 |
| (CT4 + SAG42) * 100/f | −6.65 | TTL/ImgH | 1.67 |
| (R3 − R4)/(R3 + R4) | 1.30 | | |

8th Embodiment

Figure 15:
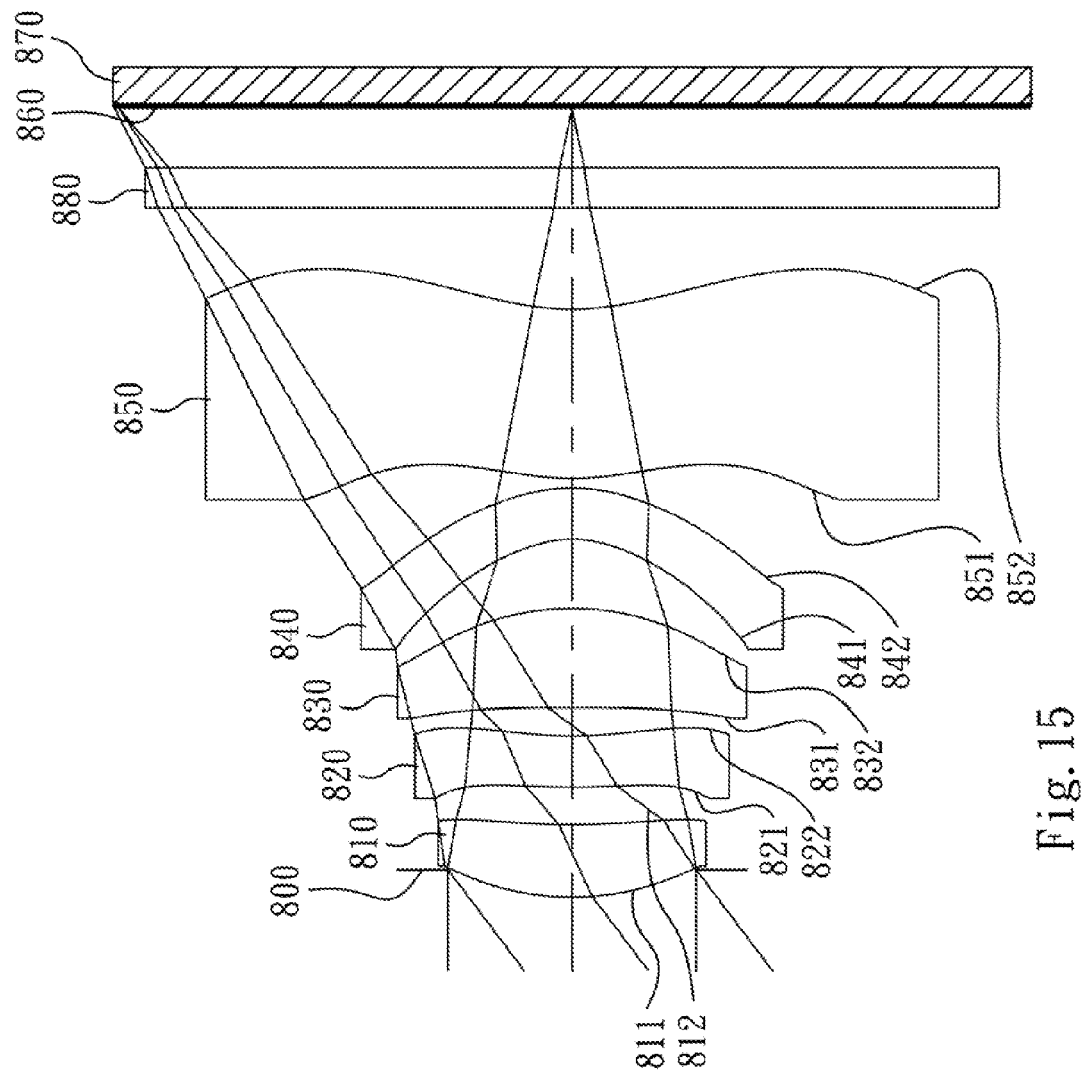
FIG. 15 is a schematic view of an image capturing optical lens system according to the 8th embodiment of the present disclosure.
Figure 16:
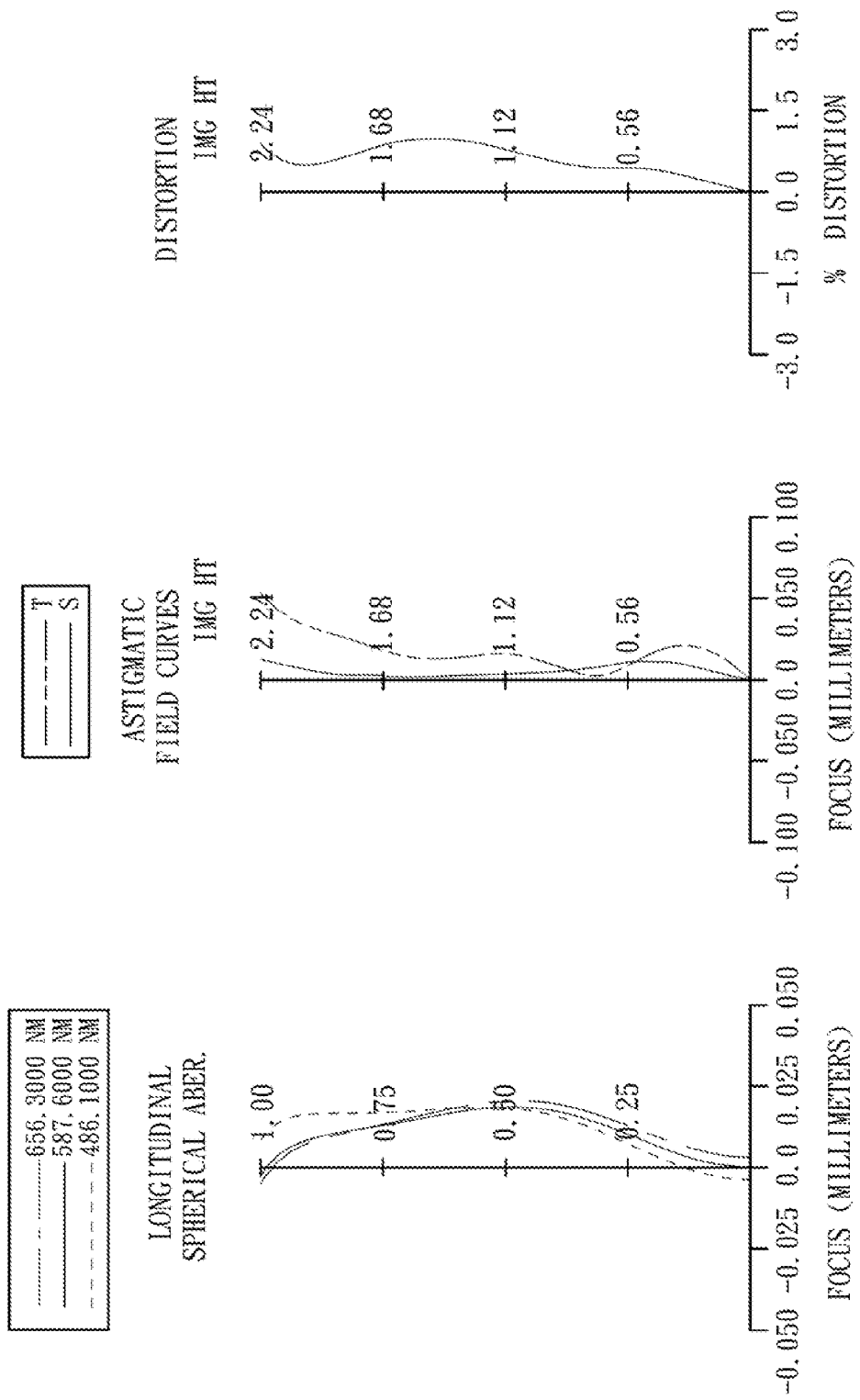
FIG. 16 shows spherical aberration curves, astigmatic field curves and a distortion curve of the image capturing optical lens system according to the 8th to embodiment.

FIG. 15 is a schematic view of an image capturing optical lens system according to the 8th embodiment of the present disclosure. FIG. 16 shows spherical aberration curves, astigmatic field curves and a distortion curve of the image capturing optical lens system according to the 8th embodiment. In FIG. 15, the image capturing optical lens system includes, in order from an object side to an image side, an aperture stop 800, the first lens element 810, the second lens element 820, the third lens element 830 the fourth lens element 840, the fifth lens element 850, an IR-cut filter 880, an image plane 860 and an image sensor 870.

The first lens element 810 with positive refractive power has a convex object-side surface 811 and a concave image-side surface 812, and is made of glass. The object-side surface 811 and the image-side surface 812 of the first lens element 810 are aspheric.

The second lens element 820 with negative refractive power has a convex object-side surface 821 and a concave image-side surface 822, and is made of plastic material. The object-side surface 821 and the image-side surface 822 of the second lens element 820 are aspheric.

The third lens element 830 with positive refractive power has a concave object-side surface 831 and a convex image-side surface 832, and is made of plastic material. The object-side surface 831 and the image-side surface 832 of the third lens element 830 are aspheric.

The fourth lens element 840 with negative refractive power has a concave object-side surface 841 and a convex image-side surface 842, and is made of plastic material. The object-side surface 841 and the image-side surface 842 of the fourth lens element 840 are aspheric.

The fifth lens element 850 with positive refractive power has a convex object-side surface 851 and a concave image-side surface 852, and is made of plastic material. The object-side surface 851 and the image-side surface 852 of the fifth lens element 850 are aspheric. Furthermore, the fifth lens element 850 has inflection points formed on the object-side surface 851 and the image-side surface 852 thereof.

The IR-cut filter 880 is made of glass, and located between the fifth lens element 850 and the image plane 860, and will not affect the focal length of the image capturing optical lens system.

The detailed optical data of the 8th embodiment are shown in Table 15 and the aspheric surface data are shown in Table 16 below.

TABLE 15

8th Embodiment
f = 2.93 mm, Fno = 2.40, HFOV = 37.0 deg.

| Surface # | | Curvature Radius | Thickness | Material | Index | Abbe # | Focal length |
|---|---|---|---|---|---|---|---|
| 0 | Object | Plano | Infinity | | | | |
| 1 | Ape. Stop | Plano | −0.136 | | | | |
| 2 | Lens 1 | 1.330860 (ASP) | 0.358 | Glass | 1.542 | 62.9 | 3.65 |
| 3 | | 3.668100 (ASP) | 0.184 | | | | |
| 4 | Lens 2 | 3.381900 (ASP) | 0.255 | Plastic | 1.640 | 23.3 | −7.82 |
| 5 | | 1.958350 (ASP) | 0.139 | | | | |
| 6 | Lens 3 | −46.511600 (ASP) | 0.489 | Plastic | 1.544 | 55.9 | 2.55 |
| 7 | | −1.353840 (ASP) | 0.339 | | | | |
| 8 | Lens 4 | −0.551780 (ASP) | 0.255 | Plastic | 1.640 | 23.3 | −3.60 |
| 9 | | −0.856540 (ASP) | 0.048 | | | | |
| 10 | Lens 5 | 1.335310 (ASP) | 0.830 | Plastic | 1.544 | 55.9 | 16.58 |
| 11 | | 1.223940 (ASP) | 0.500 | | | | |
| 12 | IR-cut filter | Plano | 0.200 | Glass | 1.517 | 64.2 | — |
| 13 | | Plano | 0.303 | | | | |
| 14 | Image | Plano | — | | | | |

Note:
Reference wavelength (d-line) is 587.6 nm.

TABLE 16

Aspheric Coefficients

| | Surface # | | | | |
|---|---|---|---|---|---|
| | 2 | 3 | 4 | 5 | 6 |
| k = | −1.18886E−01 | 5.17076E+00 | −7.79668E+00 | −1.36110E+01 | −1.00000E+00 |
| A4 = | −4.51561E−03 | −1.95137E−01 | −5.56153E−01 | −2.98673E−01 | −2.04190E−01 |
| A6 = | 1.24960E−01 | 1.31765E−01 | 4.54261E−01 | 2.75708E−01 | −1.10698E−02 |
| A8 = | −4.10745E−01 | −3.28163E−01 | −1.43092E+00 | −6.23782E−01 | 6.23580E−01 |
| A10 = | 8.19550E−01 | −4.34715E−01 | 7.83324E−01 | 3.09414E−01 | −2.55028E−01 |
| A12 = | −1.10184E+00 | 2.45857E−02 | −4.66058E−02 | −3.73841E−02 | −1.70491E+00 |
| A14 = | 8.55184E−02 | −1.22676E−01 | 7.84948E−02 | 1.52830E−02 | 2.94968E+00 |
| A16 = | | | | | −1.81800E+00 |

| | Surface # | | | | |
|---|---|---|---|---|---|
| | 7 | 8 | 9 | 10 | 11 |
| k = | 1.08617E+00 | −3.02616E+00 | −6.59819E−01 | −1.63395E+01 | −7.06730E+00 |
| A4 = | −2.00674E−02 | −8.84415E−02 | 3.61702E−01 | −2.34644E−01 | −9.43344E−02 |
| A6 = | −2.90825E−02 | −7.59129E−01 | −3.73477E−01 | 9.95190E−02 | 4.07924E−02 |
| A8 = | 1.18238E−01 | 1.50195E+00 | 1.28976E−01 | −4.99189E−02 | −1.84785E−02 |
| A10 = | 7.30965E−01 | −1.17097E+00 | 2.24378E−01 | 1.23836E−02 | 5.43330E−03 |
| A12 = | −4.52101E−01 | 8.81111E−02 | −1.10867E−01 | 5.54177E−03 | −9.89588E−04 |
| A14 = | −2.83937E−05 | 4.02431E−01 | −1.48607E−01 | −5.10504E−04 | 9.09876E−05 |
| A16 = | | −4.23905E−01 | 1.15479E−01 | −5.89230E−04 | |

In the image capturing optical lens system according to the 8th embodiment, the definitions of f, Fno, HFOV, V2, V3, CT4, CT5, T23, T34, T45, SAG42, R3, R4, R5, R6, f1, f3, f4, f5, SD, TD, TTL and ImgH are the same as those stated in the 1st embodiment with corresponding values for the 8th embodiment. Moreover, these parameters can be calculated from Table 15 and Table 16 as the following values and satisfy the following relationships:

| | | | |
|---|---|---|---|
| f (mm) | 2.93 | (R5 + R6)/(R5 − R6) | 1.06 |
| Fno | 2.40 | f/f3 | 1.15 |
| HFOV (deg.) | 37.0 | f/f3 − f/f1 | 0.35 |
| V3 − V2 | 32.6 | \|f/f4\| + \|f/f5\| | 0.99 |
| CT5/CT4 | 3.25 | (f1 − f3)/T45 | 22.93 |
| T23/T34 | 0.41 | SD/TD | 0.95 |
| (CT4 + SAG42) * 100/f | −8.31 | TTL/ImgH | 1.71 |
| (R3 − R4)/(R3 + R4) | 0.27 | | |

9th Embodiment

Figure 17:
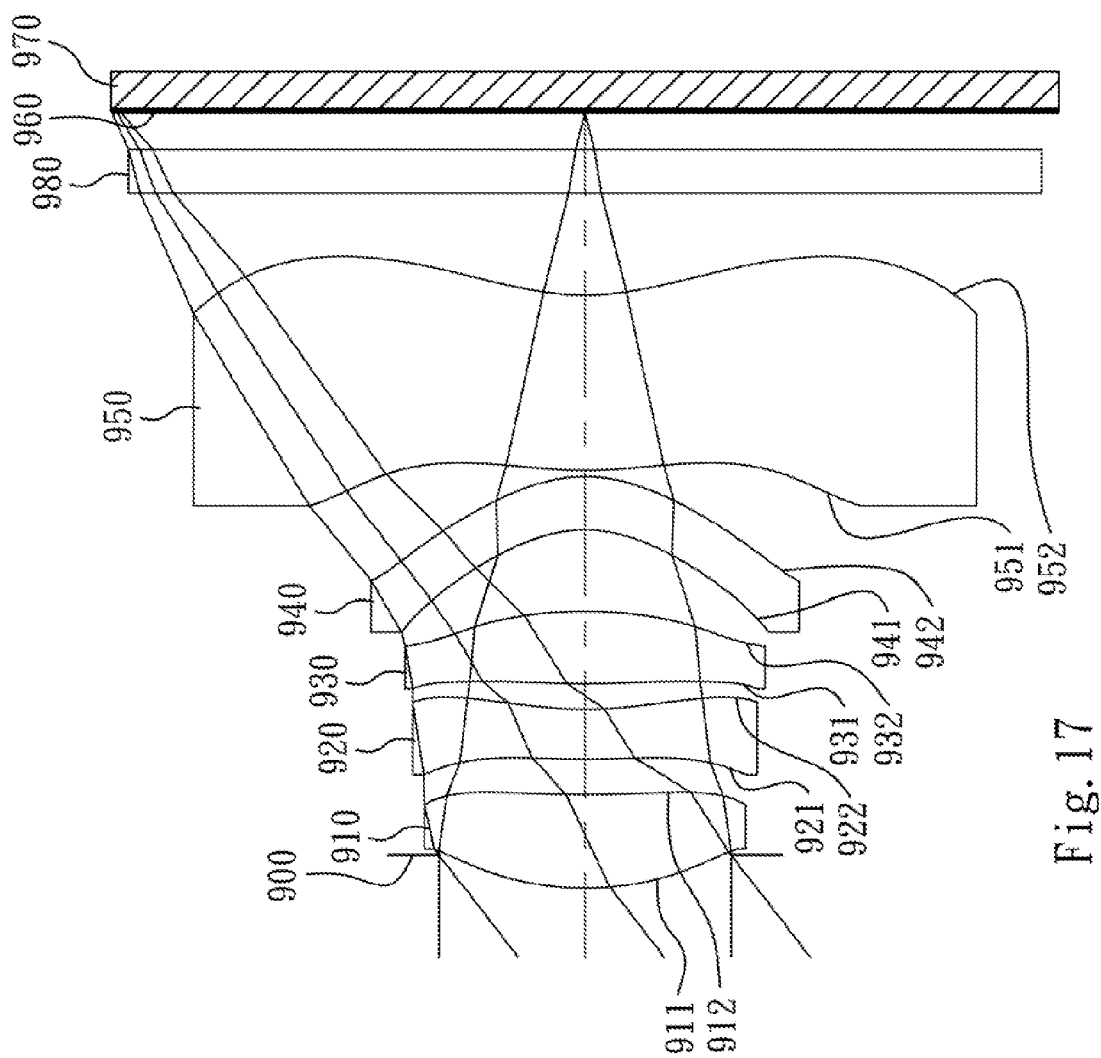
FIG. 17 is a schematic view of an image capturing optical lens system according to the 9th embodiment of the present disclosure.
Figure 18:
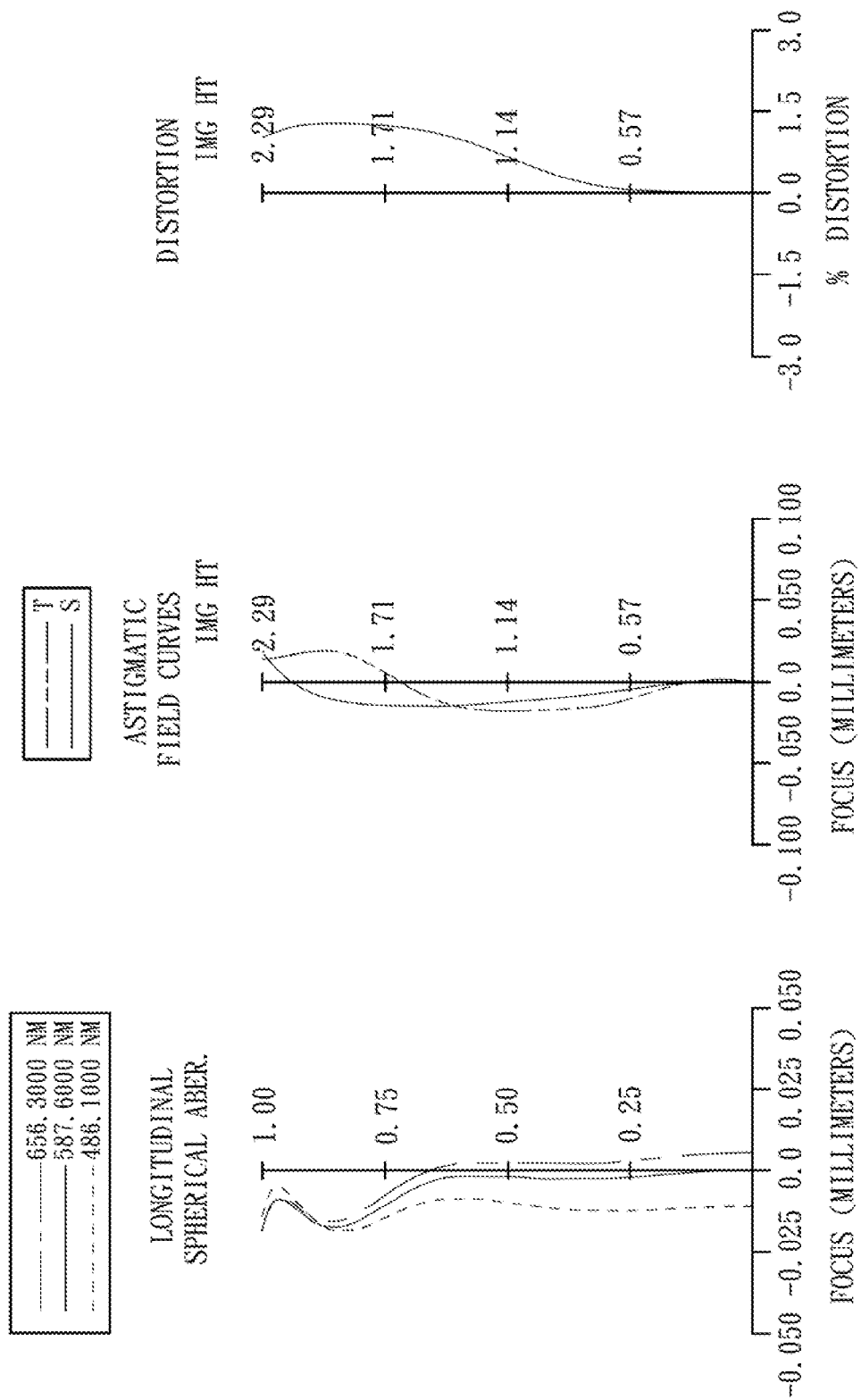
FIG. 18 shows spherical aberration curves, astigmatic field curves and a distortion curve of the image capturing optical lens system according to the 9th embodiment.

FIG. 17 is a schematic view of an image capturing optical lens system according to the 9th embodiment of the present disclosure. FIG. 18 shows spherical aberration curves, astigmatic field curves and a distortion curve of the image capturing optical lens system according to the 9th embodiment. In FIG. 17, the image capturing optical lens system includes, in order from an object side to an image side, an aperture stop 900, the first lens element 910, the second lens element 920, the third lens element 930, the fourth lens element 940, the fifth lens element 950, an IR-cut filter 980, an image plane 960 and an image sensor 970.

The first lens element 910 with positive refractive power has a convex object-side surface 911 and a concave image-side surface 912, and is made of plastic material. The object-side surface 911 and the image-side surface 912 of the first lens element 910 are aspheric.

The second lens element 920 with negative refractive power has a convex object-side surface 921 and a concave image-side surface 922, and is made of plastic material. The object-side surface 921 and the image-side surface 922 of the second lens element 920 are aspheric.

The third lens element 930 with positive refractive power has a convex object-side surface 931 and a convex image-side surface 932, and is made of plastic material. The object-side surface 931 and the mage-side surface 932 of the third lens element 930 are aspheric.

The fourth lens element 940 with negative refractive power has a concave object-side surface 941 and a convex image-side surface 942, and is made of plastic material. The object-side surface 941 and the image-side surface 942 of the fourth lens element 940 are aspheric.

The fifth lens element 950 with negative refractive power has a convex object-side surface 951 and a concave image-side surface 952, and is made of plastic material. The object-side surface 951 and the image-side surface 952 of the fifth lens element 950 are aspheric. Furthermore, the fifth lens element 950 has inflection points formed on the object-side surface 951 and the image-side surface 952 thereof.

The IR-cut filter 980 is made of glass, and located between the fifth lens element 950 and the image plane 960, and will not affect the focal length of the image capturing optical lens system.

The detailed optical data of the 9th embodiment are shown in Table 17 and the aspheric surface data are shown in Table 18 below.

TABLE 17

9 Embodiment
f = 2.94 mm, Fno = 2.07, HFOV = 37.6 deg.

| Surface # | | Curvature Radius | Thickness | Material | Index | Abbe # | Focal length |
|---|---|---|---|---|---|---|---|
| 0 | Object | Plano | Infinity | | | | |
| 1 | Ape. Stop | Plano | −0.163 | | | | |
| 2 | Lens 1 | 1.365880 (ASP) | 0.455 | Plastic | 1.544 | 55.9 | 3.21 |
| 3 | | 5.515000 (ASP) | 0.175 | | | | |
| 4 | Lens 2 | 4.194700 (ASP) | 0.240 | Plastic | 1.640 | 23.3 | −4.60 |
| 5 | | 1.690380 (ASP) | 0.126 | | | | |
| 6 | Lens 3 | 4.770800 (ASP) | 0.354 | Plastic | 1.544 | 55.9 | 2.86 |
| 7 | | −2.248610 (ASP) | 0.395 | | | | |
| 8 | Lens 4 | −0.631620 (ASP) | 0.260 | Plastic | 1.640 | 23.3 | −80.20 |
| 9 | | −0.742200 (ASP) | 0.030 | | | | |
| 10 | Lens 5 | 2.244730 (ASP) | 0.852 | Plastic | 1.544 | 55.9 | −6.34 |
| 11 | | 1.178010 (ASP) | 0.500 | | | | |
| 12 | IR-cut filter | Plano | 0.210 | Glass | 1.517 | 64.2 | — |
| 13 | | Plano | 0.190 | | | | |
| 14 | Image | Plano | — | | | | |

Note:
Reference wavelength (d-line) is 587.6 nm.

TABLE 18

Aspheric Coefficients

| | Surface # | | | | |
|---|---|---|---|---|---|
| | 2 | 3 | 4 | 5 | 6 |
| k = | −2.05248E−01 | −2.81262E+01 | −9.00000E+01 | −1.88296E+01 | −9.00000E+01 |
| A4 = | −1.74279E−03 | −1.86875E−01 | −4.94358E−01 | −2.33795E−01 | −2.18280E−01 |
| A6 = | −4.43386E−02 | 1.49446E−01 | 7.66300E−01 | 4.08113E−01 | 2.81806E−02 |
| A8 = | −8.55116E−02 | −5.16928E−01 | −1.68079E+00 | −5.46690E−01 | 6.36220E−01 |

TABLE 18-continued

| Aspheric Coefficients | | | | |
|---|---|---|---|---|
| A10 = | 5.15869E−01 | 1.12550E−01 | 1.39654E+00 | 1.12255E−01 | −4.07933E−01 |
| A12 = | −1.10184E+00 | 2.45858E−02 | −4.66057E−02 | −3.73840E−02 | −1.70491E+00 |
| A14 = | 8.55185E−02 | −1.22676E−01 | 7.84949E−02 | 1.52831E−02 | 2.94968E+00 |
| A16 = | | | | | −1.81800E+00 |

| | Surface # | | | | |
|---|---|---|---|---|---|
| | 7 | 8 | 9 | 10 | 11 |
| k = | 2.26170E+00 | −2.35496E+00 | −7.55339E−01 | −2.06502E+01 | −8.01449E+00 |
| A4 = | −1.15231E−01 | 1.24075E−01 | 4.58994E−01 | −2.39529E−01 | −9.54901E−02 |
| A6 = | −2.34306E−03 | −7.77027E−01 | −3.68514E−01 | 1.03740E−01 | 4.41261E−02 |
| A8 = | 1.08988E−01 | 1.34947E+00 | 1.34232E−01 | −4.96521E−02 | −2.07573E−02 |
| A10 = | 6.25615E−01 | −1.11090E+00 | 2.14392E−01 | 1.21381E−02 | 5.93182E−03 |
| A12 = | −5.25303E−01 | 1.89653E−01 | −1.27683E−01 | 5.31833E−03 | −9.41511E−04 |
| A14 = | −2.83428E−05 | 4.02431E−01 | −1.59697E−01 | −4.75049E−04 | 6.12254E−05 |
| A16 = | | −4.23905E−01 | 1.33108E−01 | −6.22991E−04 | |

In the image capturing optical lens system according to the 9th embodiment, the definitions of f, Fno, HFOV, V2, V3, CT4, CT5, T23, T34, T45, SAG42, R3, R4, R5, R6, f1, f3, f4, f5, SD, TD, TTL and ImgH are the same as those stated in the 1st embodiment with corresponding values for the 9th embodiment. Moreover, these parameters can be calculated from Table 17 and Table 18 as the following values and satisfy the following relationships:

| | | | |
|---|---|---|---|
| f (mm) | 2.94 | (R5 + R6)/(R5 − R6) | 0.36 |
| Fno | 2.07 | f/f3 | 1.03 |
| HFOV (deg.) | 37.6 | f/f3 − f/f1 | 0.11 |
| V3 − V2 | 32.6 | |f/f4| + |f/f5| | 0.50 |
| CT5/CT4 | 3.28 | (f1 − f3)/T45 | 11.76 |
| T23/T34 | 0.32 | SD/TD | 0.94 |
| (CT4 + SAG42) * 100/f | −8.41 | TTL/ImgH | 1.63 |
| (R3 − R4)/(R3 + R4) | 0.43 | | |

10th Embodiment

Figure 19:
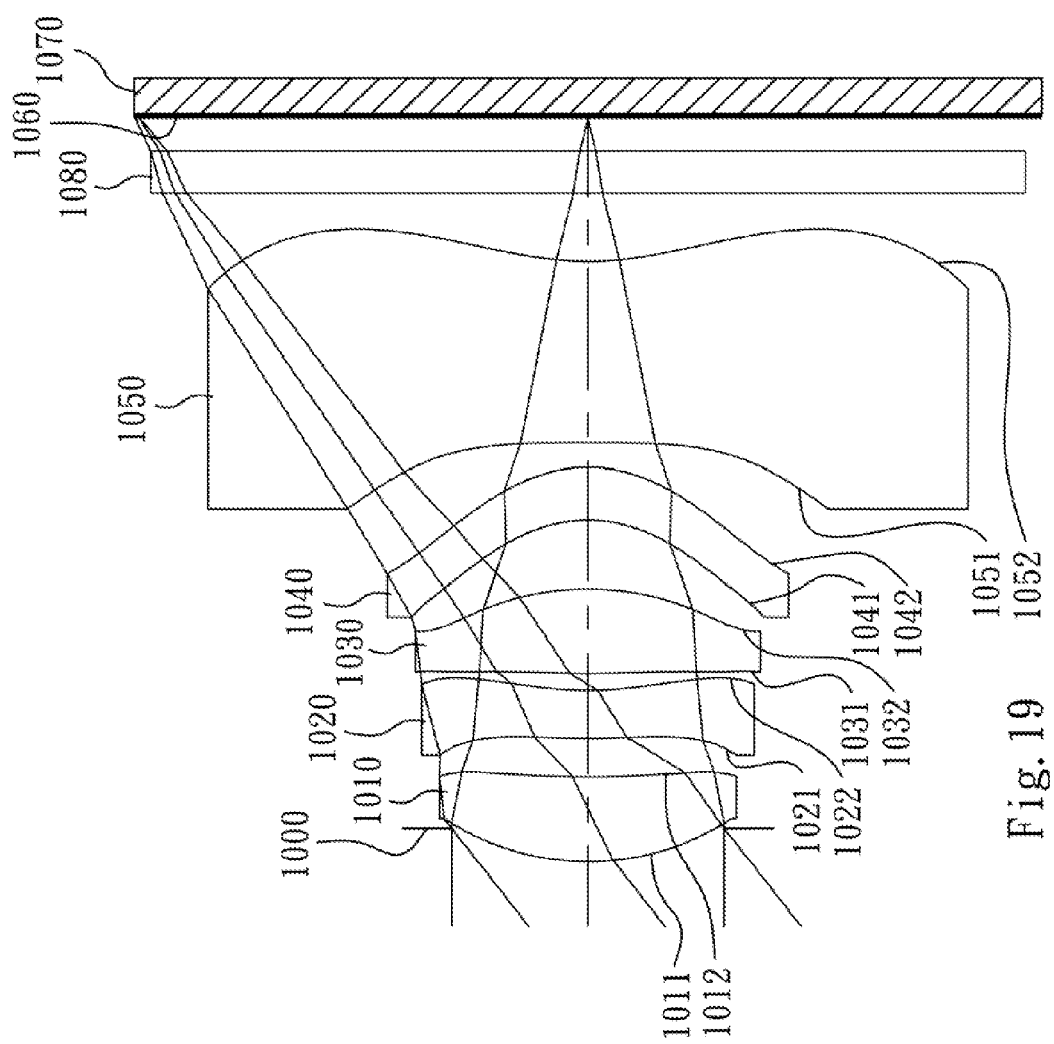
FIG. 19 is a schematic view of an image capturing optical lens system according to the 10th embodiment of the present disclosure.
Figure 20:
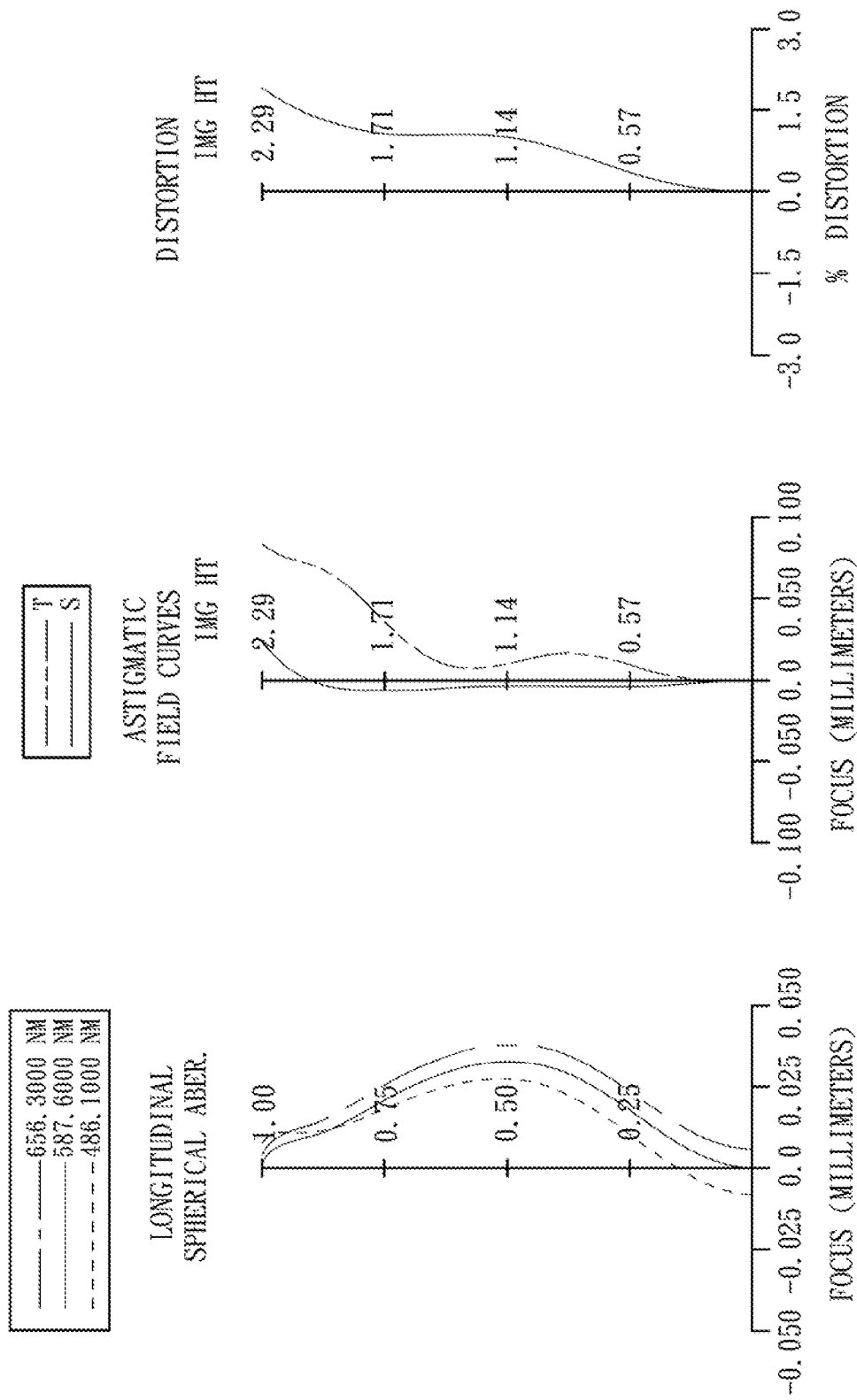
FIG. 20 shows spherical aberration curves, astigmatic field curves and a distortion curve of the image capturing optical lens system according to the 10th embodiment.

FIG. 19 is a schematic view of an image capturing optical lens system according to the 10th embodiment of the present disclosure. FIG. 20 shows spherical aberration curves, astigmatic field curves and a distortion curve of the image capturing optical lens system according to the 10th embodiment. In FIG. 19, the image capturing optical lens system includes, in order from an object side to an image side, an aperture stop 1000, the first lens element 1010, the second lens element 1020, the third lens element 1030, the fourth lens element 1040, the fifth lens element 1050, an IR-cut filter 1080, an image plane 1060 and an image sensor 1070.

The first lens element 1010 with positive refractive power has a convex object-side surface 1011 and a concave image-side surface 1012, and is made of plastic material. The object-side surface 1011 and the image-side surface 1012 of the first lens element 1010 are aspheric.

The second lens element 1020 with negative refractive power has a convex object-side surface 1021 and a concave image-side surface 1022, and is made of plastic material. The object-side surface 1021 and the image-side surface 1022 of the second lens element 1020 are aspheric.

The third lens element 1030 with positive refractive power has a convex object-side surface 1031 and a convex image-side surface 1032, and is made of plastic material. The object-side surface 1031 and the image-side surface 1032 of the third lens element 1030 are aspheric.

The fourth lens element 1040 with negative refractive power has a concave object-side surface 1041 and a convex image-side surface 1042, and is made of plastic material. The object-side surface 1041 and the image-side surface 1042 of the fourth lens element 1040 are aspheric.

The fifth lens element 1050 with negative refractive power has a concave object-side surface 1051 and a concave image-side surface 1052, and is made of plastic material. The object-side surface 1051 and the image-side surface 1052 of the fifth lens element 1050 are aspheric. Furthermore, the fifth lens element 1050 has inflection points formed on the object-side surface 1051 and the image-side surface 1052 thereof.

The IR-cut filter 1080 is made of glass, and located between the fifth lens to element 1050 and the image plane 1060, and will not affect the focal length of the image capturing optical lens system.

The detailed optical data of the 10th embodiment are shown in Table 19 and the aspheric surface data are shown in Table 20 below.

TABLE 19

10th Embodiment
f = 2.86 mm, Fno = 2.07, HFOV = 37.9 deg.

| Surface # | | Curvature Radius | Thickness | Material | Index | Abbe # | Focal length |
|---|---|---|---|---|---|---|---|
| 0 | Object | Plano | Infinity | | | | |
| 1 | Ape. Stop | Plano | −0.170 | | | | |
| 2 | Lens 1 | 1.314200 (ASP) | 0.429 | Plastic | 1.535 | 56.3 | 3.31 |
| 3 | | 4.545500 (ASP) | 0.198 | | | | |
| 4 | Lens 2 | 3.699600 (ASP) | 0.240 | Plastic | 1.650 | 21.4 | −4.36 |
| 5 | | 1.562550 (ASP) | 0.087 | | | | |

TABLE 19-continued

10th Embodiment
f = 2.86 mm, Fno = 2.07, HFOV = 37.9 deg.

| Surface # | | Curvature Radius | Thickness | Material | Index | Abbe # | Focal length |
|---|---|---|---|---|---|---|---|
| 6 | Lens 3 | 5.620900 (ASP) | 0.430 | Plastic | 1.530 | 55.8 | 2.28 |
| 7 | | −1.497270 (ASP) | 0.348 | | | | |
| 8 | Lens 4 | −0.720090 (ASP) | 0.270 | Plastic | 1.614 | 25.6 | 10.10 |
| 9 | | −0.737270 (ASP) | 0.124 | | | | |
| 10 | Lens 5 | −28.985500 (ASP) | 0.920 | Plastic | 1.530 | 55.8 | −2.69 |
| 11 | | 1.513220 (ASP) | 0.350 | | | | |
| 12 | IR-cut filter | Plano | 0.210 | Glass | 1.517 | 64.2 | — |
| 13 | | Plano | 0.180 | | | | |
| 14 | Image | Plano | — | | | | |

Note:
Reference wavelength (d-line) is 587.6 nm.

TABLE 20

Aspheric Coefficients

| Surface # | | | | |
|---|---|---|---|---|
| 2 | 3 | 4 | 5 | 6 |

| | | | | | |
|---|---|---|---|---|---|
| k = | −1.55534E−02 | 8.84563E+00 | −5.96062E+01 | −1.20071E+01 | −1.76668E+01 |
| A4 = | −1.42218E−02 | −1.38917E−01 | −5.17153E−01 | −2.96791E−01 | −2.31245E−01 |
| A6 = | 1.45062E−01 | 5.53575E−02 | 6.91914E−01 | 4.31789E−01 | 8.54414E−03 |
| A8 = | −5.03269E−01 | 5.42910E−02 | −1.39460E+00 | −5.17382E−01 | 6.25366E−01 |
| A10 = | 1.06018E+00 | −5.70777E−01 | 6.83355E−01 | 6.74296E−02 | −1.46789E−01 |
| A12 = | −1.10184E+00 | 2.45858E−02 | −4.66057E−02 | −3.73840E−02 | −1.70491E+00 |
| A14 = | 8.55185E−02 | −1.22676E−01 | 7.84949E−02 | 1.52831E−02 | 2.94968E+00 |
| A16 = | | | | | −1.81800E+00 |

| Surface # | | | | |
|---|---|---|---|---|
| 7 | 8 | 9 | 10 | 11 |

| | | | | | |
|---|---|---|---|---|---|
| k = | 1.20218E+00 | −9.39451E−01 | −6.66223E−01 | 1.00000E+00 | −7.76717E+00 |
| A4 = | −2.61919E−02 | 1.23337E−02 | 1.27413E−01 | −2.39529E−01 | −9.54901E−02 |
| A6 = | −5.97714E−02 | −1.94308E−01 | 4.03586E−02 | 1.03740E−01 | 4.41261E−02 |
| A8 = | 1.78594E−01 | 1.33642E+00 | 2.07054E−01 | −4.96521E−02 | −2.07573E−02 |
| A10 = | 8.11168E−01 | −1.34779E+00 | 8.09121E−02 | 1.21381E−02 | 5.93182E−03 |
| A12 = | −5.25303E−01 | 1.89653E−01 | −1.56096E−01 | 5.31833E−03 | −9.41511E−04 |
| A14 = | −2.83432E−05 | 4.02431E−01 | −1.03956E−01 | −4.75049E−04 | 6.12254E−05 |
| A16 = | | −4.23905E−01 | 1.08742E−01 | −6.22991E−04 | |

In the image capturing optical lens system according to the 10th embodiment, the definitions of f, Fno, HFOV, V2, V3, CT4, CT5, T23, T34, T45, SAG42, R3, R4, R5, R6, f1, f3, f4, f5, SD, TD, TTL and ImgH are the same as those stated in the 1st embodiment with corresponding values for the 10th embodiment. Moreover, these parameters can be calculated from Table 19 and Table 20 as the following values and satisfy the following relationships:

| | | | |
|---|---|---|---|
| f (mm) | 2.86 | (R5 + R6)/(R5 − R6) | 0.58 |
| Fno | 2.07 | f/f3 | 1.26 |
| HFOV (deg.) | 37.9 | f/f3 − f/f1 | 0.39 |
| V3 − V2 | 34.4 | |f/f4| + |f/f5| | 1.35 |
| CT5/CT4 | 3.41 | (f1 − f3)/T45 | 8.28 |
| T23/T34 | 0.25 | SD/TD | 0.94 |
| (CT4 + SAG42) * 100/f | −9.50 | TTL/ImgH | 1.63 |
| (R3 − R4)/(R3 + R4) | 0.41 | | |

11th Embodiment

Figure 21:
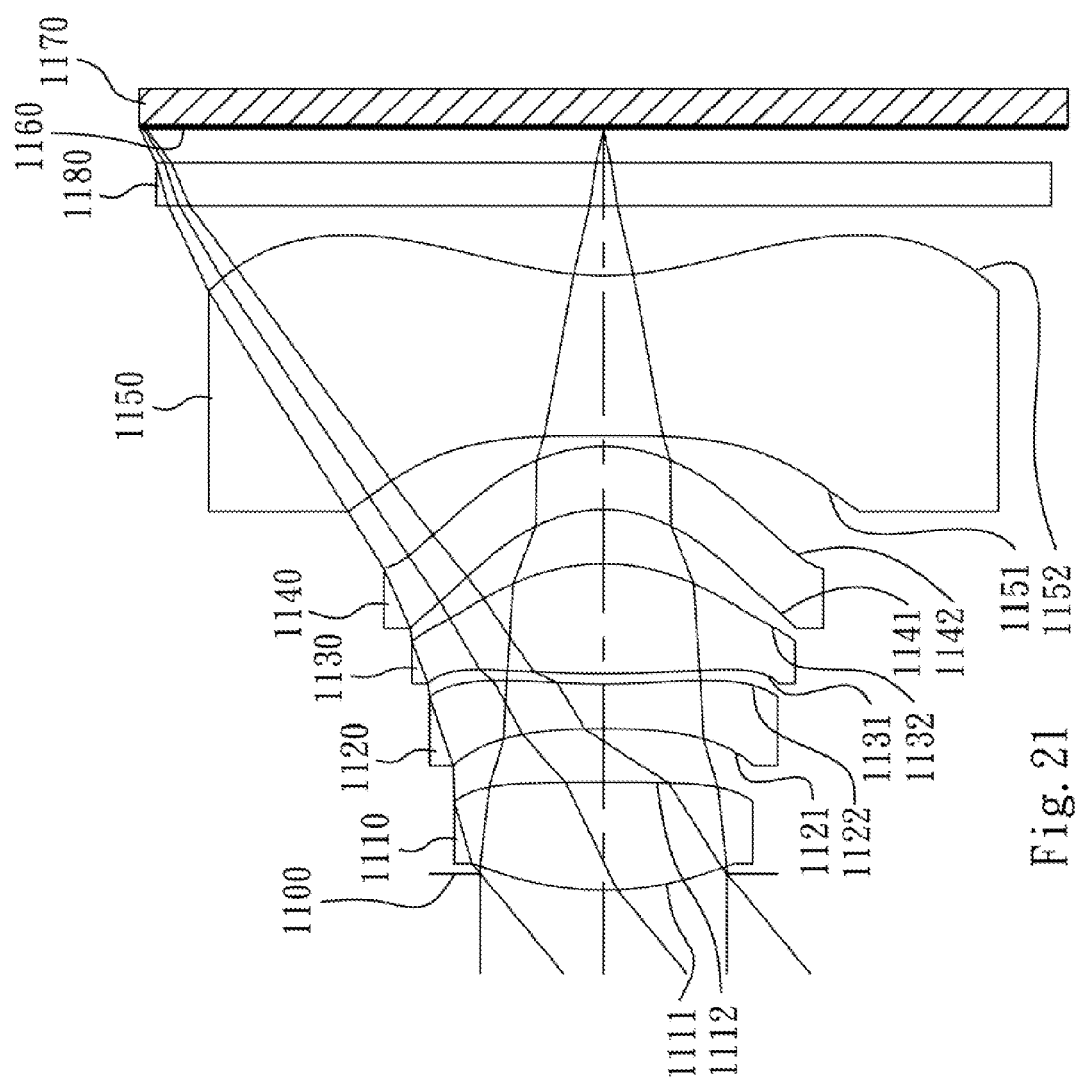
FIG. 21 is a schematic view of an image capturing optical lens system according to the 11th embodiment of the present disclosure.
Figure 22:
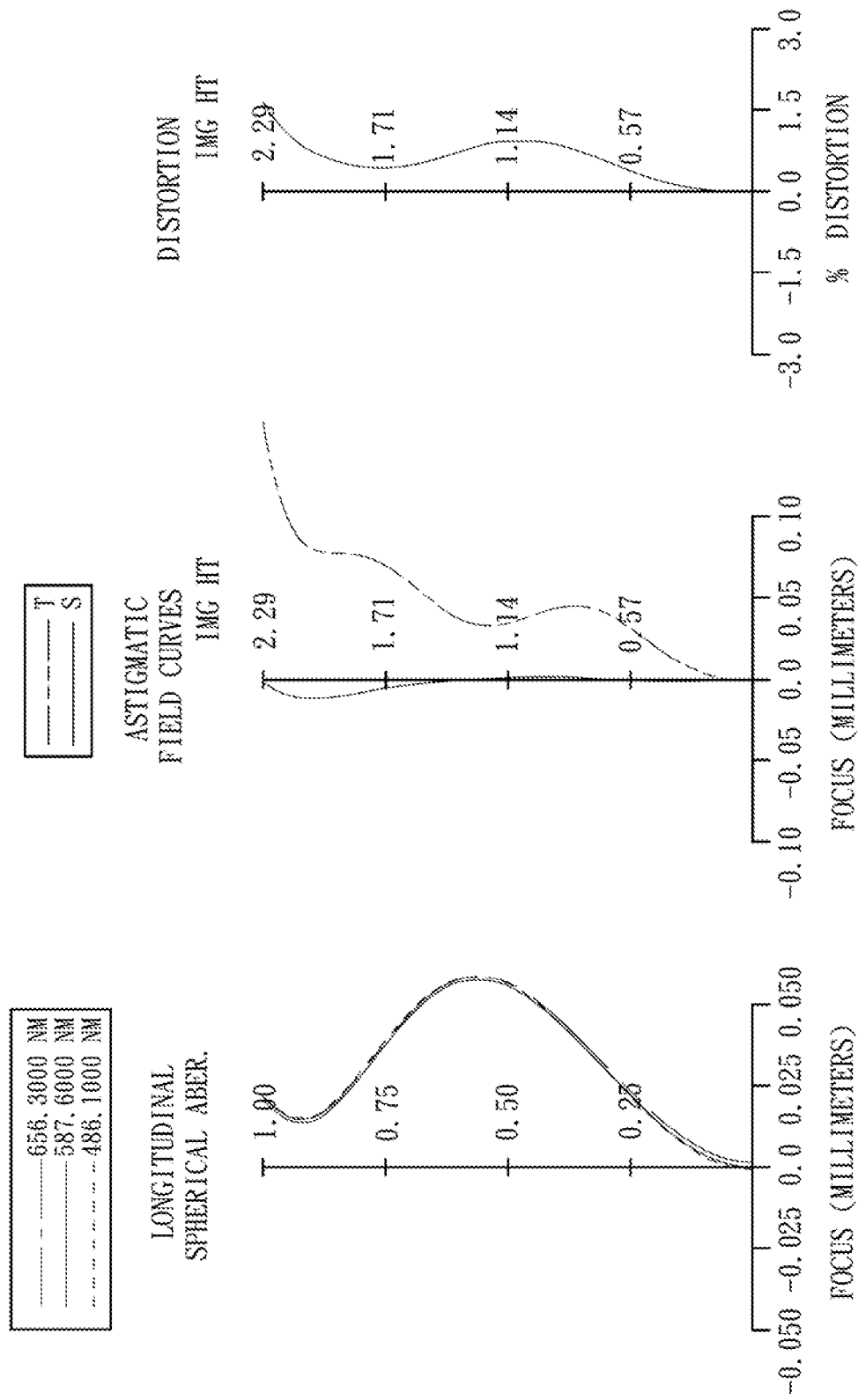
FIG. 22 shows spherical aberration curves, astigmatic field curves and a distortion curve of the image capturing optical lens system according to the 11th embodiment.

FIG. 21 is a schematic view of an image capturing optical lens system according to the 11th embodiment of the present disclosure. FIG. 22 shows spherical aberration curves, astigmatic field curves and a distortion curve of the image capturing optical lens system according to the 11th embodiment. In FIG. 21, the image capturing optical lens system includes, in order from an object side to an image side, an aperture stop 1100, the first lens element 1110, the second lens element 1120, the third lens element 1130, the fourth lens element 1140, the fifth lens element 1150, an IR-cut filter 1180, an image plane 1160 and an image sensor 1170.

The first lens element 1110 with positive refractive power has a convex object-side surface 1111 and a convex image-side surface 1112, and is made of plastic material. The object-side surface 1111 and the image-side surface 1112 of the first lens element 1110 are aspheric.

The second lens element 1120 with negative refractive power has a concave object-side surface 1121 and a concave image-side surface 1122, and is made of plastic material. The object-side surface 1121 and a concave image-side surface 1122 of the second lens element 1120 are aspheric.

The third lens element 1130 with positive refractive power has a convex object-side surface 1131 and a convex image-side surface 1132, and is made of plastic material. The object-side surface 1131 and the image-side surface 1132 of the third lens element 1130 are aspheric.

The fourth lens element 1140 with negative refractive power has a concave object-side surface 1141 and a convex image-side surface 1142, and is made of plastic material. The object-side surface 1141 and the image-side surface 1142 of the fourth lens element 1140 are aspheric.

The fifth lens element 1150 with negative refractive power has a concave object-side surface 1151 and a concave image-side surface 1152 and is made of plastic material. The object-side surface 1151 and the image-side surface 1152 of the fifth lens element 1150 are aspheric. Furthermore, the fifth lens element 1150 has inflection points formed on the object-side surface 1151 and the image-side surface 1152 thereof.

The IR-cut filter 1180 is made of glass, and located between the fifth lens element 1150 and the image plane 1160, and will not affect the focal length of the image capturing optical lens system.

The detailed optical data of the 11th embodiment are shown in Table 21 and the aspheric surface data are shown in Table 22 below.

In the image capturing optical lens system according to the 11th embodiment, the definitions of f, Fno, HFOV, V2, V3, CT4, CT5, T23, T34, T45, SAG42, R3, R4, R5, R6, f1, f3, f4, f5, SD, TD, TTL and ImgH are the same as those stated in the 1st embodiment with corresponding values for the 11th embodiment. Moreover, these parameters can be calculated from Table 21 and Table 22 as the following values and satisfy the following relationships:

| | | | |
|---|---|---|---|
| f (mm) | 2.69 | (R5 + R6)/(R5 − R6) | 0.70 |
| Fno | 2.20 | f/f3 | 1.65 |
| HFOV (deg.) | 39.6 | f/f3 − f/f1 | 0.66 |
| V3 − V2 | 32.4 | \|f/f4\| + \|f/f5\| | 1.07 |
| CT5/CT4 | 2.56 | (f1 − f3)/T45 | 20.82 |
| T23/T34 | 0.19 | SD/TD | 0.97 |

TABLE 21

11th Embodiment
f = 2.69 mm, Fno = 2.20, HFOV = 39.6 deg.

| Surface # | | Curvature Radius | Thickness | Material | Index | Abbe # | Focal length |
|---|---|---|---|---|---|---|---|
| 0 | Object | Plano | Infinity | | | | |
| 1 | Ape. Stop | Plano | −0.084 | | | | |
| 2 | Lens 1 | 1.491750 (ASP) | 0.534 | Plastic | 1.530 | 55.8 | 2.74 |
| 3 | | −45.732200 (ASP) | 0.269 | | | | |
| 4 | Lens 2 | −5.525800 (ASP) | 0.220 | Plastic | 1.632 | 23.4 | −3.17 |
| 5 | | 3.195700 (ASP) | 0.051 | | | | |
| 6 | Lens 3 | 5.621600 (ASP) | 0.546 | Plastic | 1.530 | 55.8 | 1.63 |
| 7 | | −0.988780 (ASP) | 0.272 | | | | |
| 8 | Lens 4 | −0.674000 (ASP) | 0.310 | Plastic | 1.614 | 25.6 | −68.43 |
| 9 | | −0.804860 (ASP) | 0.053 | | | | |
| 10 | Lens 5 | −22.988500 (ASP) | 0.795 | Plastic | 1.530 | 55.8 | −2.61 |
| 11 | | 1.491450 (ASP) | 0.350 | | | | |
| 12 | IR-cut filter | Plano | 0.210 | Glass | 1.517 | 64.2 | — |
| 13 | | Plano | 0.178 | | | | |
| 14 | Image | Plano | — | | | | |

Note:
Reference wavelength (d-line) is 587.6 nm.

TABLE 22

Aspheric Coefficients

| | Surface # | | | | |
|---|---|---|---|---|---|
| | 2 | 3 | 4 | 5 | 6 |
| k = | −3.61060E−01 | 2.00000E+01 | 4.89019E+00 | −3.77850E+01 | 2.00000E+01 |
| A4 = | −4.43661E−02 | −1.15179E−01 | −6.15468E−01 | −3.33270E−01 | −6.91440E−02 |
| A6 = | 4.27146E−02 | −3.26615E−01 | 9.01991E−01 | 4.28779E−01 | −2.32924E−01 |
| A8 = | −1.21829E−01 | 6.27819E−01 | −1.07892E+00 | −4.25240E−01 | 4.81925E−01 |
| A10 = | 8.26566E−02 | −1.16115E+00 | 1.59134E−01 | −6.10360E−03 | −2.33129E−01 |
| A12 = | −1.10184E+00 | −3.28612E−02 | −1.04650E−01 | −6.54936E−02 | −1.68997E+00 |
| A14 = | 8.55185E−02 | −1.22676E−01 | 7.84949E−02 | 4.88201E−02 | 2.96101E+00 |
| A16 = | | | | | −1.77160E+00 |

| | Surface # | | | | |
|---|---|---|---|---|---|
| | 7 | 8 | 9 | 10 | 11 |
| k = | −1.15418E−01 | −8.17305E−01 | −5.37748E−01 | −2.00000E+01 | −5.37873E+00 |
| A4 = | 1.61626E−01 | 4.15090E−02 | 5.65227E−02 | −2.39529E−01 | −9.54901E−02 |
| A6 = | −3.55035E−03 | −2.36569E−01 | 7.11105E−02 | 1.03740E−01 | 4.41261E−02 |
| A8 = | 7.39000E−03 | 1.24919E+00 | 8.04424E−02 | −4.96521E−02 | −2.07573E−02 |
| A10 = | 6.56700E−02 | −1.34638E+00 | 9.27795E−02 | 1.21381E−02 | 5.93182E−03 |
| A12 = | −4.95949E−01 | 5.04166E−01 | −6.47950E−02 | 5.31833E−03 | −9.41511E−04 |
| A14 = | −8.97857E−03 | 3.95601E−01 | −4.45212E−02 | −4.75049E−04 | 6.12254E−05 |
| A16 = | | −4.21114E−01 | 5.20915E−02 | −6.22991E−04 | |

-continued

| | | | |
|---|---|---|---|
| (CT4 + SAG42) * 100/f | −11.04 | TTL/ImgH | 1.63 |
| (R3 − R4)/(R3 + R4) | 3.74 | | |

12th Embodiment

Figure 23:
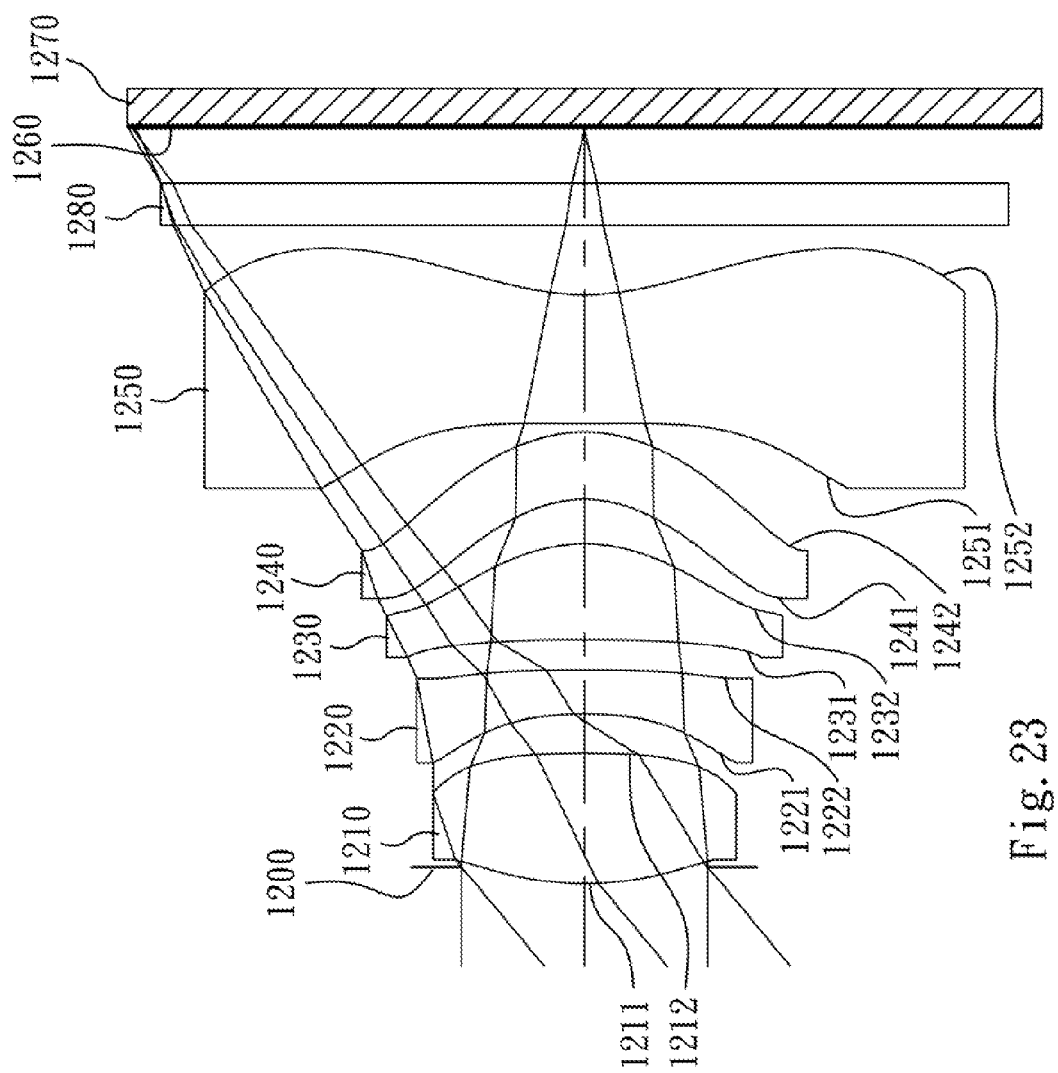
FIG. 23 is a schematic view of an image capturing optical lens system according to the 12th embodiment of the present disclosure.
Figure 24:
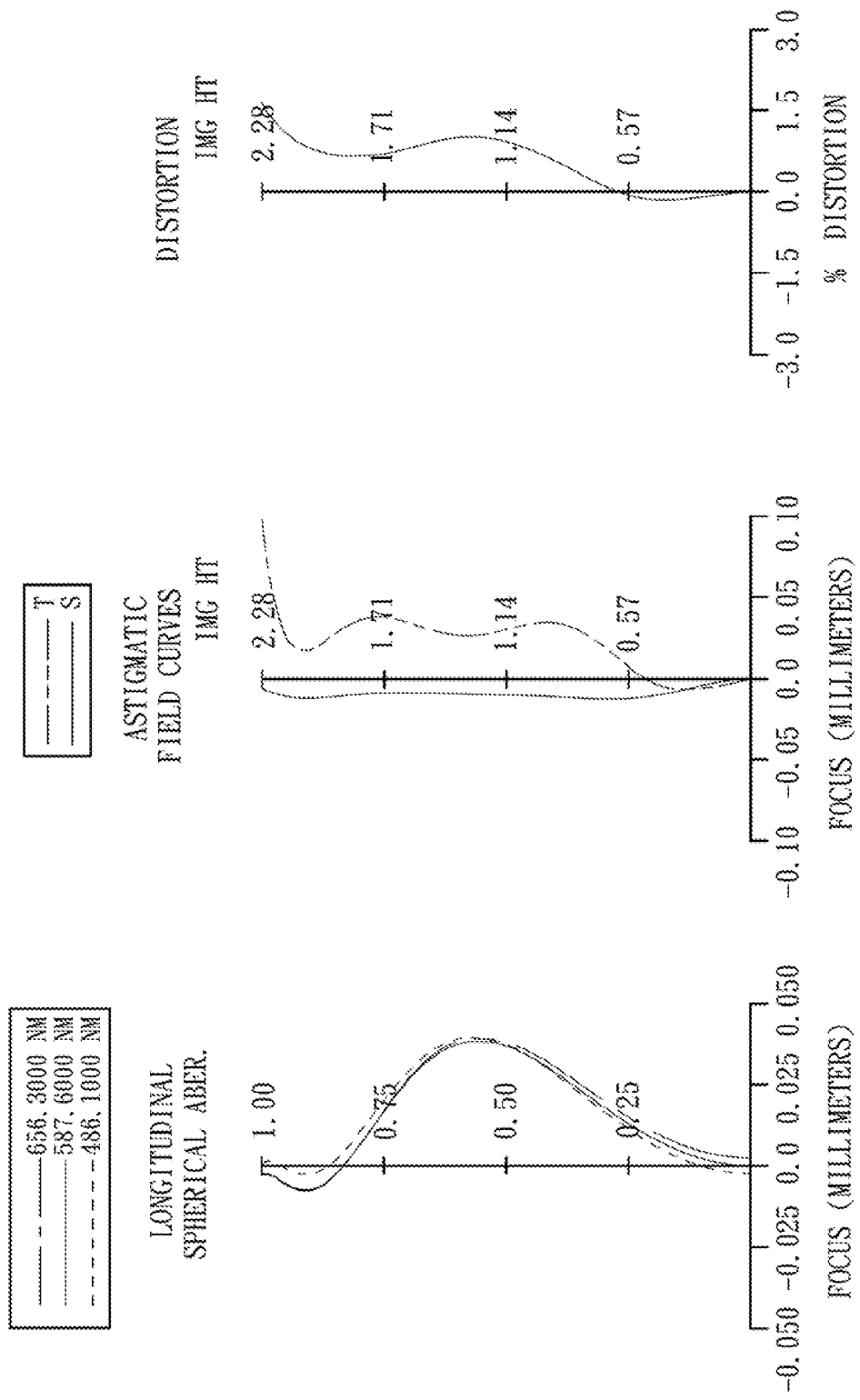
FIG. 24 shows spherical aberration curves, astigmatic field curves and a distortion curve of the image capturing optical lens system according to the 12th embodiment.

FIG. 23 is a schematic view of an image capturing optical lens system according to the 12th embodiment of the present disclosure. FIG. 24 shows spherical aberration curves, astigmatic field curves and a distortion curve of the image capturing optical lens system according to the 12th embodiment. In FIG. 23, the image capturing optical lens system includes, in order from an object side to an image side, an aperture stop 1200, the first lens element 1210, the second lens element 1220, the third lens element 1230, the fourth lens element 1240, the fifth lens element 1250, an IR-cut filter 1280, an image plane 1260 and an image sensor 1270.

The first lens element 1210 with positive refractive power has a convex object-side surface 1211 and a convex image-side surface 1212, and is made of plastic material. The object-side surface 1211 and the image-side surface 1212 of the first lens element 1210 are aspheric.

The second lens element 1220 with negative refractive power has a concave object-side surface 1221 and a convex image-side surface 1222, and is made of plastic material. The object-side surface 1221 and the image-side surface 1222 of the second lens element 1220 are aspheric.

The third lens element 1230 with positive refractive power has a concave object-side surface 1231 and a convex image-side surface 1232, and is made of plastic material. The object-side surface 1231 and the image-side surface 1232 of the third lens element 1230 are aspheric.

The fourth lens element 1240 with negative refractive power has a concave object-side surface 1241 and a convex image-side surface 1242, and is made of plastic material. The object-side surface 1241 and the image-side surface 1242 of the fourth lens element 1240 are aspheric.

The fifth lens element 1250 with negative refractive power has a convex object-side surface 1251 and a concave image-side surface 1252, and is made of plastic material. The object-side surface 1251 and the image-side surface 1252 of the fifth lens element 1250 are aspheric. Furthermore, the fifth lens element 1250 has inflection points formed on the object-side surface 1251 and the image-side surface 1252 thereof.

The IR-cut filter 1280 is made of glass, and located between the fifth lens element 1250 and the image plane 1260, and will not affect the focal length of the image capturing optical lens system.

The detailed optical data of the 12th embodiment are shown in Table 23 and the aspheric surface data are shown in Table 24 below.

TABLE 23

12th Embodiment
f = 2.71 mm, Fno = 2.20, HFOV = 39.6 deg.

| Surface # | | Curvature Radius | Thickness | Material | Index | Abbe # | Focal length |
|---|---|---|---|---|---|---|---|
| 0 | Object | Plano | Infinity | | | | |
| 1 | Ape. Stop | Plano | −0.084 | | | | |
| 2 | Lens 1 | 1.541630 (ASP) | 0.653 | Plastic | 1.530 | 55.8 | 2.35 |
| 3 | | −5.487200 (ASP) | 0.193 | | | | |
| 4 | Lens 2 | −2.167790 (ASP) | 0.220 | Plastic | 1.632 | 23.4 | −3.68 |
| 5 | | −33.732300 (ASP) | 0.155 | | | | |
| 6 | Lens 3 | −8.224900 (ASP) | 0.477 | Plastic | 1.530 | 55.8 | 1.69 |
| 7 | | −0.824420 (ASP) | 0.225 | | | | |
| 8 | Lens 4 | −0.628920 (ASP) | 0.334 | Plastic | 1.607 | 26.6 | −26.70 |
| 9 | | −0.785590 (ASP) | 0.042 | | | | |
| 10 | Lens 5 | 18.810400 (ASP) | 0.645 | Plastic | 1.530 | 55.8 | −2.49 |
| 11 | | 1.216730 (ASP) | 0.350 | | | | |
| 12 | IR-cut filter | Plano | 0.210 | Glass | 1.517 | 64.2 | — |
| 13 | | Plano | 0.282 | | | | |
| 14 | Image | Plano | — | | | | |

Note:
Reference wavelength (d-line) is 587.6 nm.

TABLE 24

Aspheric Coefficients

| | Surface # | | | | |
|---|---|---|---|---|---|
| | 2 | 3 | 4 | 5 | 6 |
| k = | −2.70846E−01 | 1.63190E+01 | 3.58687E+00 | 2.00000E+01 | 1.80845E+01 |
| A4 = | −3.70977E−02 | −2.82166E−01 | −6.63548E−01 | −3.16595E−01 | 4.69327E−02 |
| A6 = | −1.55611E−01 | −3.08270E−01 | 8.77778E−01 | 4.65972E−01 | −3.33287E−01 |
| A8 = | 4.38861E−01 | 2.43126E−01 | −8.98718E−01 | −2.69993E−01 | 4.96787E−01 |
| A10 = | −7.85688E−01 | −2.42846E−01 | 1.10037E+00 | 2.02769E−01 | 3.17823E−02 |
| A12 = | −1.10184E+00 | −3.22216E−02 | −1.00783E−01 | −6.55537E−02 | −1.69026E+00 |
| A14 = | 8.55185E−02 | −1.22676E−01 | 7.84949E−02 | 4.88975E−02 | 2.96067E+00 |
| A16 = | | | | | −1.77202E+00 |

TABLE 24-continued

Aspheric Coefficients

| | Surface # | | | | |
|---|---|---|---|---|---|
| | 7 | 8 | 9 | 10 | 11 |
| k = | −4.29850E−01 | −9.39176E−01 | −5.49475E−01 | 1.00000E+00 | −5.51572E+00 |
| A4 = | 2.87842E−01 | 2.14938E−01 | 1.48974E−01 | −2.39529E−01 | −9.54901E−02 |
| A6 = | −2.48538E−02 | −2.85728E−01 | 7.53822E−02 | 1.03740E−01 | 4.41261E−02 |
| A8 = | 3.76979E−02 | 1.17665E+00 | 1.66734E−02 | −4.96521E−02 | −2.07573E−02 |
| A10 = | 6.80149E−01 | −1.42442E+00 | 6.54607E−02 | 1.21381E−02 | 5.93182E−03 |
| A12 = | −5.15444E−01 | 4.77988E−01 | −5.52946E−02 | 5.31833E−03 | −9.41511E−04 |
| A14 = | 3.60367E−02 | 5.56508E−01 | −2.36456E−02 | −4.75049E−04 | 6.12254E−05 |
| A16 = | | −3.84870E−01 | 5.69169E−02 | −6.22991E−04 | |

In the image capturing optical lens system according to the 12th embodiment, the definitions of f, Fno, HFOV, V2, V3, CT4, CT5, T23, T34, T45, SAG42, R3, R4, R5, R6, f1, f3, f4, f5, SD, TD, TTL and ImgH are the same as those stated in the 1st embodiment with corresponding values for the 12th embodiment. Moreover, these parameters can be calculated from Table 23 and Table 24 as the following values and satisfy the following relationships:

| f (mm) | 2.71 | (R5 + R6)/(R5 − R6) | 1.22 |
|---|---|---|---|
| Fno | 2.20 | f/f3 | 1.60 |
| HFOV (deg.) | 39.6 | |f/f3 − f/f1| | 0.45 |
| V3 − V2 | 32.4 | |f/f4| + |f/f5| | 1.19 |
| CT5/CT4 | 1.93 | (f1 − f3)/T45 | 15.60 |
| T23/T34 | 0.69 | SD/TD | 0.97 |
| (CT4 + SAG42) * 100/f | −9.54 | TTL/ImgH | 1.63 |
| (R3 − R4)/(R3 + R4) | −0.88 | | |

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. An image capturing optical lens system comprising, in order from an object side to an image side:
 a first lens element with positive refractive power having a convex object-side surface;
 a second lens element with negative refractive power;
 a third lens element with positive refractive power having a convex image-side surface, wherein an object-side surface and the image-side surface of the third lens element are aspheric;
 a fourth lens element with refractive power having a concave object-side surface and a convex image-side surface, wherein the object-side surface and the image-side surface of the fourth lens element are aspheric; and
 a fifth lens element with refractive power made of plastic material, and having a concave mage-side surface, wherein an object-side surface and the image-side surface of the fifth lens element are aspheric, and the fifth lens element has at least one inflection point formed on at least one of the object-side surface and the image-side surface thereof;
 wherein the first through fifth lens elements are five independent and non-cemented lens elements, a focal length of the image capturing optical lens system is f, a focal length of the first lens element is f1, a focal length of the third lens element is f3, an axial distance between the fourth lens element and the fifth lens element is T45, a central thickness of the fourth lens element is CT4, a central thickness of the fifth lens element is CT5, and the following relationships are satisfied:

$0.25 < f/f3 - f/f1 < 0.85;$ $2.5 < (f1-f3)/T45;$ and $1.6 < CT5/CT4 < 6.0.$

2. The image capturing optical lens system of claim 1, wherein an Abbe number of the second lens element is V2, an Abbe number of the third lens element is V3, and the following relationship is satisfied:

$0 \leq V3 - V2 < 50.$

3. The image capturing optical lens system of claim 2, wherein the focal to length of the image capturing optical lens system is f, a focal length of the fourth lens element is f4, a focal length of the fifth lens element is f5, and the following relationship is satisfied:

$0 < |f/f4| + |f/f5| < 1.5.$

4. The image capturing optical lens system of claim 3, wherein the second lens element has a concave image-side surface.

5. The image capturing optical lens system of claim 1, wherein the fifth lens element has a convex object-side surface.

6. The image capturing optical lens system of claim 5, wherein a curvature radius of an object-side surface of the second lens element is R3, a curvature radius of an image-side surface of the second lens element is R4, and the following relationship is satisfied:

$0.2 < (R3-R4)/(R3+R4) < 1.5.$

7. The image capturing optical lens system of claim 5, wherein the fourth lens element has negative refractive power.

8. The image capturing optical lens system of claim 7, wherein a curvature radius of the object-side surface of the third lens element is R5, a curvature radius of the image-side surface of the third lens element is R6, and the following relationship is satisfied:

$0.3 < (R5+R6)/(R5-R6) < 1.0.$

9. The image capturing optical lens system of claim 5, wherein an axial distance between the object-side surface of the first lens element and an image plane is TTL, a maximum image height of the image capturing optical lens system is ImgH, and the following relationship is satisfied:

$TTL/ImgH < 1.85.$

10. The image capturing optical lens system of claim 1, further comprising:
a stop, wherein an axial distance between the stop and the image-side surface of the fifth lens element is SD, an axial distance between the object-side surface of the first lens element and the image-side surface of the fifth lens element is TD, and the following relationship is satisfied:

$0.75 < SD/TD < 1.2$.

11. The image capturing optical lens system of claim 10, wherein the focal length of the image capturing optical lens system is f, the focal length of the third lens element is f3, and the following relationship is satisfied:

$0.7 < f/f3 < 1.8$.

12. The image capturing optical lens system of claim 11, wherein the focal length of the image capturing optical lens system is f, a focal length of the fourth lens element is f4, a focal length of the fifth lens element is f5, and the following relationship is satisfied:

$0 < |f/f4| + |f/f5| < 1.0$.

13. The image capturing optical lens system of claim 11, wherein the first lens element has a concave image-side surface.

14. The image capturing optical lens system of claim 11, wherein the focal length of the image capturing optical lens system is f, the central thickness of the fourth lens element is CT4, a distance in parallel with an optical axis from a maximum effective diameter position to an axial vertex on the image-side surface of the fourth lens element is SAG42, and the following relationship is satisfied:

$-15 < (CT4+SAG42) \times 100/f < -4$.

15. An image capturing optical lens system comprising, in order from an object side to an image side:
a first lens element with positive refractive power having a convex object-side surface;
a second lens element with negative refractive power;
a third lens element with positive refractive power having a convex image-side surface, wherein an object-side surface and the image-side surface of the third lens element are aspheric;
a fourth lens element with refractive power, wherein an object-side surface and an image-side surface of the fourth lens element are aspheric; and
a fifth lens element with refractive power made of plastic material, and having a concave image-side surface, wherein an object-side surface and the image-side surface of the fifth lens element are aspheric, and the fifth lens element has at least one inflection point formed on at least one of the object-side surface and the image-side surface thereof;
wherein a focal length of the image capturing optical lens system is f, a focal length of the first lens element is f1, a focal length of the third lens element is f3, an axial distance between the second lens element and the third lens element is T23, an axial distance between the third lens element and the fourth lens element is T34, an axial distance between the fourth lens element and the fifth lens element is T45, and the following relationships are satisfied:

$0.25 < f/f3 - f/f1 < 0.85$;

$2.5 < (f1 - f3)/T45$; and $0.1 < T23/T34 < 1.0$.

16. The image capturing optical lens system of claim 15, wherein the fourth lens element has a concave object-side surface and a convex image-side surface, and the focal length of the image capturing optical lens system is f, a central thickness of the fourth lens element is CT4, a distance in parallel with an optical axis from a maximum effective diameter position to an axial vertex on the image-side surface of the fourth lens element is SAG42, and the following relationship is satisfied:

$-22 < (CT4+SAG42) \times 100/f < 0$.

17. The image capturing optical lens system of claim 16, wherein the focal length of the image capturing optical lens system is f, the focal length of to the third lens element is f3, and the following relationship is satisfied:

$0.7 < f/f3 < 1.8$.

18. The image capturing optical lens system of claim 17, wherein the central thickness of the fourth lens element is CT4, a central thickness of the fifth lens element is CT5, and the following relationship is satisfied:

$1.6 < CT5/CT4 < 6.0$.

19. The image capturing optical lens system of claim 16, wherein the second lens element has a concave image-side surface, and the fifth lens element has a convex object-side surface.

20. The image capturing optical lens system of claim 15, wherein the focal length of the image capturing optical lens system is f, a focal length of the fourth lens element is f4, a focal length of the fifth lens element is f5, and the following relationship is satisfied:

$0 < |f/f4| + |f/f5| < 1.5$.

21. The image capturing optical lens system of claim 20, wherein the fourth lens element has negative refractive power, a curvature radius of the object-side surface of the third lens element is R5, a curvature radius of the image-side surface of the third lens element is R6, and the following relationship is satisfied:

$0.3 < (R5+R6)/(R5-R6) < 1.0$.

22. The image capturing optical lens system of claim 20, wherein a curvature radius of an object-side surface of the second lens element is R3, a curvature radius of an image-side surface of the second lens element is R4, and the following relationship is satisfied:

$0.2 < (R3-R4)/(R3+R4) < 1.5$.

23. The image capturing optical lens system of claim 20, further comprising:
a stop, wherein an axial distance between the stop and the image-side surface of the fifth lens element is SD, an axial distance between the object-side surface of the first lens element and the image-side surface of the fifth lens element is TD, and the following relationship is satisfied:

$0.75 < SD/TD < 1.2$.

* * * * *

UNITED STATES PATENT AND TRADEMARK OFFICE
CERTIFICATE OF CORRECTION

PATENT NO. : 8,675,289 B2  Page 1 of 1
APPLICATION NO. : 13/612859
DATED : March 18, 2014
INVENTOR(S) : Tsung-Han Tsai and Hsin-Hsuan Huang It is certified that error appears in the above-identified patent and that said Letters Patent is hereby corrected as shown below:

In the Claims (1) In column 39, line 57, Claim 1 of the issued patent reads as "... concave mage-side surface", but it should read as "... concave image-side surface".

(2) In column 40, line 33, Claim 3 of the issued patent reads as "... the focal to length of ...", but it should read as "... the focal length of ...".

(3) In column 42, line 19, Claim 17 of the issued patent reads as "... the focal length of to the third lens element ...", but it should read as "... the focal length of the third lens element ...".

(4) In column 42, line 37, Claim 20 of the issued patent reads as "0<|f/f4|+|f/f5<1.5", but it should read as "0<|f/f4|+|f/f5|<1.5".

Signed and Sealed this
Eleventh Day of November, 2014

Michelle K. Lee
*Deputy Director of the United States Patent and Trademark Office*